(12) United States Patent  
Volta et al.

(10) Patent No.: US 11,906,361 B2
(45) Date of Patent: Feb. 20, 2024

(54) PORTABLE DEVICE COMBINING INDICIA SCAN AND CONTACTLESS TEMPERATURE FUNCTIONS

(71) Applicant: Datalogic I.P. Tech S.R.L., Lippo di Calderara di Reno (IT)

(72) Inventors: Romano Volta, Bologna (IT); Valentina Volta, Bologna (IT); Pietro Todescato, Eugene, OR (US); Andrew Duncan, Brighton, CO (US); Giuseppe di Bari, Bologna (IT); Claudio Mazzone, Bologna (IT); Pierluigi Piletti, Castel San Pietro Terme (IT)

(73) Assignee: DATALOGIC IP TECH S.R.L., Bologna (IT)

( * ) Notice: Subject to any disclaimer, the term of this patent is extended or adjusted under 35 U.S.C. 154(b) by 523 days.

(21) Appl. No.: 17/083,001

(22) Filed: Oct. 28, 2020

(65) Prior Publication Data

US 2022/0128410 A1 Apr. 28, 2022

(51) Int. Cl.
*G01J 5/00* (2022.01)
*G01J 5/02* (2022.01)
*H04N 5/33* (2023.01)

(52) U.S. Cl.
CPC .............. *G01J 5/0265* (2013.01); *H04N 5/33* (2013.01); *G01J 2005/0077* (2013.01); *G01J 2005/0092* (2013.01)

(58) Field of Classification Search
CPC .......... G01K 1/165; G01K 13/20; G01K 7/22; G06V 20/63; G06V 20/00; G06V 10/00; G06V 40/00
See application file for complete search history.

(56) References Cited

U.S. PATENT DOCUMENTS 5,880,452 A * 3/1999 Plesko ............... G06K 7/10653
235/462.43
8,593,251 B2 11/2013 Heller
(Continued)

FOREIGN PATENT DOCUMENTS

AU 2013205582 A1 * 1/2014 ......... H04L 12/2818
CN 109100048 A 12/2018
(Continued)

OTHER PUBLICATIONS

17083001_2023-11-07_EP_2733641_A2_H.pdf,May 2014.*
(Continued)

*Primary Examiner* — Gail Kaplan Verbitsky
(74) *Attorney, Agent, or Firm* — The Juhasz Law Firm

(57) ABSTRACT

A scanning device includes: a motion sensor to detect motion imparted to the scanning device; a distance detector to determine a distance between the scanning device and a surface; an infrared detector to capture a temperature of the surface; an image sensor to capture an image of an indicia encoding data on the surface; and a processor configured to store the captured image and temperature, configured to operate the motion sensor to detect motion being imparted to the scanning device when in a low power state, and configured to transition the scanning device out of the low power state in response to such imparted motion by: operating the distance detector to determine the distance to the surface; and determining whether to operate the infrared detector to
(Continued)

capture the temperature of the surface and whether to operate the image sensor to capture the image of the indicia, based on the distance.

20 Claims, 20 Drawing Sheets

(56) References Cited

U.S. PATENT DOCUMENTS

| | | | |
|---|---|---|---|
| 10,028,658 B2 | 7/2018 | Wang et al. | |
| 2005/0150959 A1* | 7/2005 | Izzo | G06K 7/10881 |
| | | | 235/472.02 |
| 2007/0057067 A1 | 3/2007 | He | |
| 2010/0019882 A1* | 1/2010 | Stern | G06K 7/0008 |
| | | | 340/10.1 |
| 2016/0239795 A1* | 8/2016 | Burch, V | G06Q 10/087 |
| 2016/0262631 A1 | 9/2016 | Shen | |
| 2020/0026831 A1* | 1/2020 | Alameh | G06V 40/19 |
| 2021/0369122 A1* | 12/2021 | Lane | A61B 5/743 |
| 2022/0191389 A1* | 6/2022 | Lei | H04N 23/61 |
| 2023/0045610 A1* | 2/2023 | Iyer | H04L 65/1083 |

FOREIGN PATENT DOCUMENTS

| | | | | |
|---|---|---|---|---|
| CN | 109633667 A | | 4/2019 | |
| CN | 110916620 A | | 3/2020 | |
| DE | 102013001349 A1 | * | 7/2014 | A61B 90/98 |
| EP | 2733641 A2 | * | 5/2014 | G06F 1/1626 |
| EP | 3537332 A1 | * | 9/2019 | G01K 13/00 |
| JP | H06222158 A | * | 8/1994 | |
| JP | H1152064 A | * | 2/1999 | |
| JP | 2004198237 A | * | 7/2004 | |
| JP | 2004525583 A | * | 8/2004 | |
| JP | 2019001325 A | * | 1/2019 | |
| WO | WO 2019174955 A | * | 9/2019 | |
| WO | WO-2019203351 A1 | * | 10/2019 | G01J 5/025 |
| WO | WO202185363 A1 | * | 9/2021 | |

OTHER PUBLICATIONS

17083001_2023-11-07_WO_2019203351_A1_H.pdf, Oct. 2019.*
17083001_2023-11-07_JP_2004198237_A_H.pdf,Jul. 2004.*
17083001_2023-11-07_JP_2004525583_A_H.pdf,Aug. 2004.*
17083001_2023-11-07_JP_H06222158_A_H.pdf,Aug. 1994.*
17083001_2023-11-07_JP_H1152064_A_H.pdf,Feb. 1999.*
Cilico Temperature Measuring Mobile Computer, Brochure, website visited Oct. 7, 2020 https://www.carema.nl/resize/c6t-smart-handheld-temprature-readerr_16895012593772.pdf/c6t-spec-sheetpdf.pdf, Cilico Microelectronics, Xi'an, China (5 pages).
ALC Brochure, Autotrack On-demand temperature tracking, website visited Oct. 7, 2020 https://www.alcaidc.com/Public/product/productinformation.aspx?itemcode=76300223&ProductName=AUTOTRACK%20AutotrackOnDemandTEMPT%20SOFTWARE, ALC Technologies, Singapore, Auto-ID distributor, dated May 15, 2020 (2 pages).
HD-SL6T Stationary Code reader, Weaver Software, Sroda Wielopolska, Poland, website visited Oct. 7, 2020 https://shop.hdwr.eu/gb/body-temperature-measurement/47-stationary-code-reader-with-temperature-measurement-hd-sl6t-5907614660703.html (7 pages).
IDATA 25T temperature scanning and barcode reader, IDATA Global, Shenzhen City, China, datasheet, website visited Oct. 7, 2020 http://www.idataglobal.com/product/idata-25t.html (4 pages).
Jimi IoT brochure for non-contact temperature measurement and face recognition solution for COVID-19 fight, Jimi IoT Co., Shenzhen, China, dated Mar. 11, 2020 (7 pages).
Meridian Personnel Management Solution Kiosk, brochure updated Aug. 18, 2020, Meridian Kiosks, Aberdeen, NC, website visited Oct. 7, 2020 https://www.meridiankiosks.com/solutions/personnel-management-solution/ (11 pages).
Notification of Transmittal of the International Search Report and the Written Opinion of the International Searching Authority PCT/EP2021 /079690, J25 Jan. 2022 (14 pages).
ISR and Written Opinion of the International Searching Authority (9 pages).

* cited by examiner

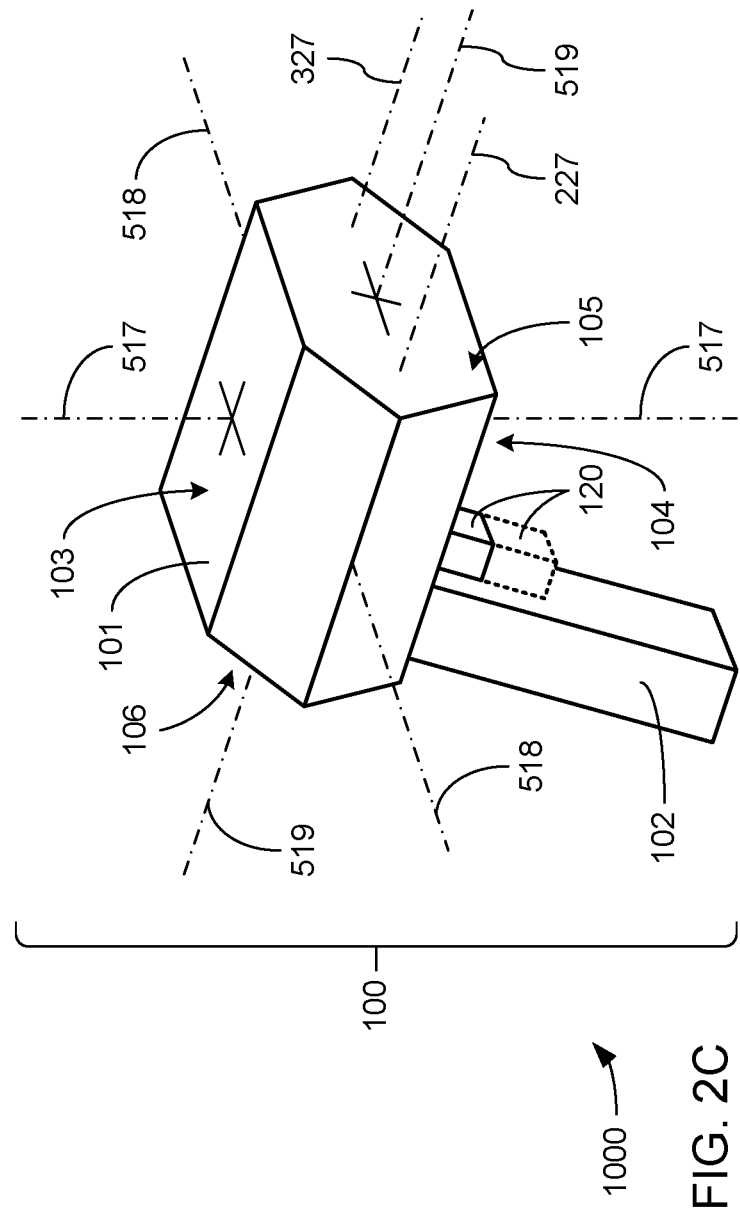

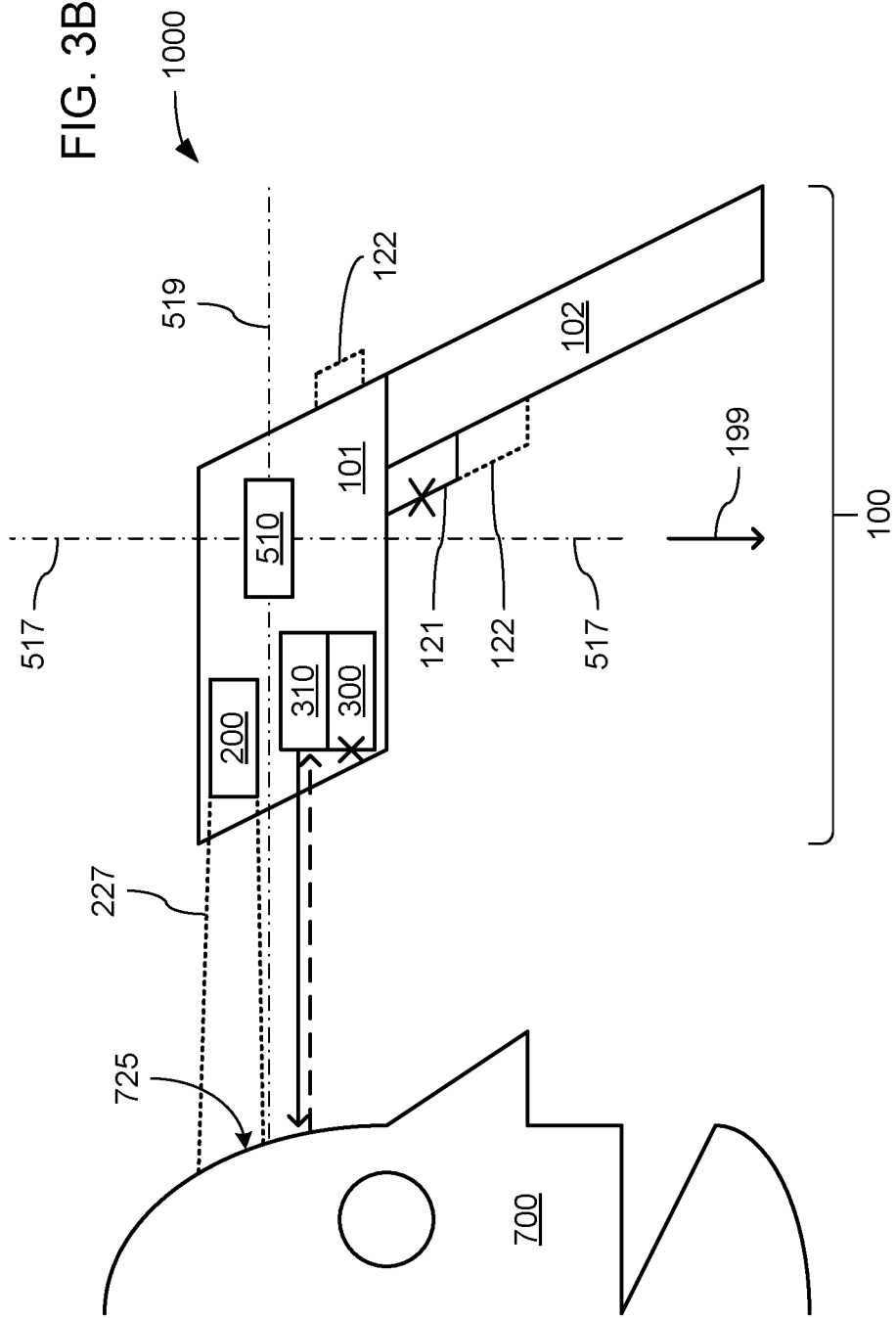

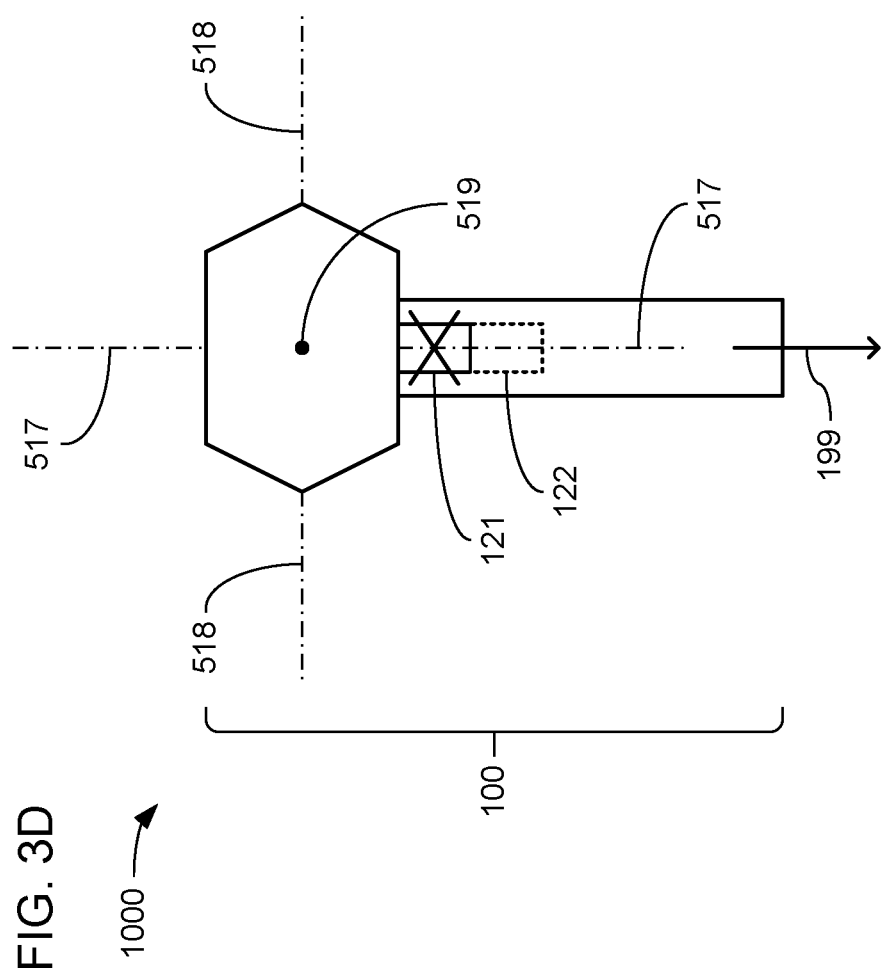

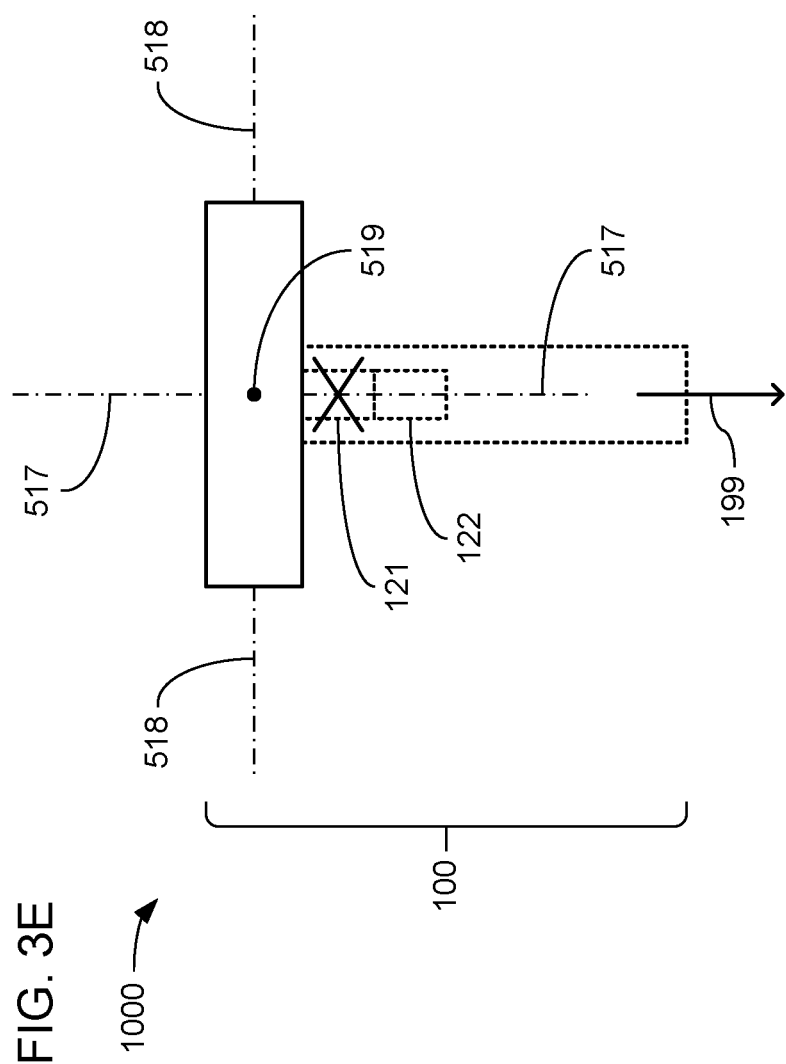

PORTABLE DEVICE COMBINING INDICIA SCAN AND CONTACTLESS TEMPERATURE FUNCTIONS

BACKGROUND

1. Technical Field

The present disclosure relates to portable devices and systems for use in the decode of encoded data markings applied to surfaces of objects, and for use in the contactless measurement of temperatures of surfaces of objects.

2. Description of the Related Art

The application of encoded data markings that encode data (e.g., indicia such as barcodes, digital watermarks and/or human-readable text) to a surface of an object for subsequent capture and decoding to retrieve data encoded therein is well known. Also well known is the use of a scanning device to capture an image of such a surface in an effort to capture an image of one or more encoded data markings for decoding. Further well known is the use of such markings, together with such capturing and decoding thereof, in organizing such activities as the transport, storage and inventorying of objects in various industries.

Such a scanning device may be a portable scanning device maintained at a location at which an object bearing one or more of such encoded data markings may be stored, through which such an object may be transported, and/or at which such an object may be offered for sale. By way of example, such a scanning device may be carried by personnel at a warehouse to enable the capture of one or more encoded data markings carried on a surface of an object (e.g., a box, a crate, a palletized load, etc.) as the object is transported into the warehouse, is stored within the portion of the warehouse, is retrieved from such storage and/or is transported out of the warehouse. Also by way of example, such a scanning device may be carried by personnel at a store, a performance venue or other place of business to enable the capture of one or more encoded data markings carried on a surface of an object as the object is transported thereto or therefrom, and/or is presented as part of an admission procedure (e.g., a package of a product that is being purchased thereat, a package that is being delivered or is being picked up by a courier, a ticket that is being presented for admission to attend an event thereat, a ticket that is being presented to board transportation to another location, etc.).

Also well known is the use of contactless thermometers to measure a temperature of a surface of an object from a distance and without touching the surface. Such use of a contactless thermometer to measure the temperature of a component of an engine or other device in operation, or to measure the temperature of the forehead of a person are both well known. More specifically, within medical and/or public health facilities, and/or at other more varied locations during a time of a widespread incidence of disease (e.g., a viral pandemic), it is well known to use a contactless thermometer to quickly and hygienically measure the temperature of the foreheads of numerous persons as part of an effort to screen for and/or triage persons who may have a fever that may be a symptom of a particular disease or other medical condition.

It is well known for scanning devices (for scanning indicia) and contactless thermometers to be entirely separate devices, even though there are variations of both may take a similar "pistol-like" physical configuration having a distinct head portion to which a pistol-like grip may be attached that carries a pistol-like trigger control that is operable to trigger the indicia scanning operation in the case of a portable indicia scanning device, or the temperature measurement operation in the case of a contactless thermometer. It is also well known for relatively small and flat portable computing devices, such as personal data assistants (PDAs), so-called "smart phones" and/or "tablet" computing devices to either directly incorporate the necessary image capturing and/or illumination components needed to provide an indicia scanning function, or to be capable of accepting the attachment of an external add-on "module" that contains such components. Regardless of the exact physical configuration of a portable device (e.g., whether the physical configuration includes a pistol-like grip), it may be deemed useful to combine both of the functions of indicia scanning and temperature measurement into a single device to better accommodate situations in which both the need to scan indicia and the need to measure temperatures may exist.

However, such a combined device presents the difficulty of better enabling an operator to select which of these two functions is to be performed. Where the selection is between scanning an indicia carried by an object and measuring a temperature of a forehead, there is the concern that an accidental triggering of the indicia scanning function while such a combination device is pointed toward a person's face may result in eye injuries as light of a type and intensity often used in scanning an indicia is accidentally directed into one or both of a person's eyes. Thus, a mechanism to provide some degree of prevention against such accidental events is needed.

BRIEF SUMMARY

Technologies are described for enabling the provision of a portable device operable to perform the dual functions of contactless temperature measurement and the scanning and decoding of indicia with automated selection between these two functions based on one or more detected conditions. Technologies are also described for enabling the provision of a processing system that incorporates such a device to generate a data set of data collected by such a device.

A scanning device includes: a motion sensor configured to detect motion imparted to the scanning device; a distance detector configured to determine a distance between the scanning device and a surface; an infrared detector configured to capture a temperature of the surface; an image sensor configured to capture an image of an indicia that encodes data on the surface; and a processor coupled to at least a storage configured to store the captured image and the captured temperature. The processor is configured to: operate the motion sensor to detect motion being imparted to the scanning device when the scanning device is in a low power state; and in response to the detection of motion being imparted to the scanning device, the processor is further configured to transition the scanning device out of the low power state by performance of operations including operate the distance detector to determine the distance between the scanning device and the surface, and determine, based at least on the distance between the scanning device and the surface, whether to operate the infrared detector to capture the temperature of the surface, and whether to operate the image sensor to capture the image of the indicia.

A method includes operating a motion sensor of a scanning device to detect motion being imparted to the scanning device when the scanning device is in a low power state. The method also includes, in response to the detection of motion being imparted to the device, transitioning the device out of the low power state by performing operations including: operating a distance detector of the scanning device to determine the distance between the scanning device and a surface; and determining, by a processor of the scanning device, and based at least on the distance between the scanning device and the surface, whether to operate an infrared detector of the scanning device to capture a temperature of the surface, and whether to operate an image sensor of the scanning device to capture an image of an indicia that encodes data on the surface.

BRIEF DESCRIPTION OF THE DRAWINGS

FIGS. 2A, 2B, 2C, 2D and 2E, together, show aspects of an example internal architecture of embodiments of the portable device of the processing system of FIG. 1

FIGS. 3A, 3B, 3C, 3D, 3E, 3F, 3G and 3H, together, show aspects of the operation of embodiments of the portable device of the processing system of FIG. 1.

DETAILED DESCRIPTION

Figure 1:
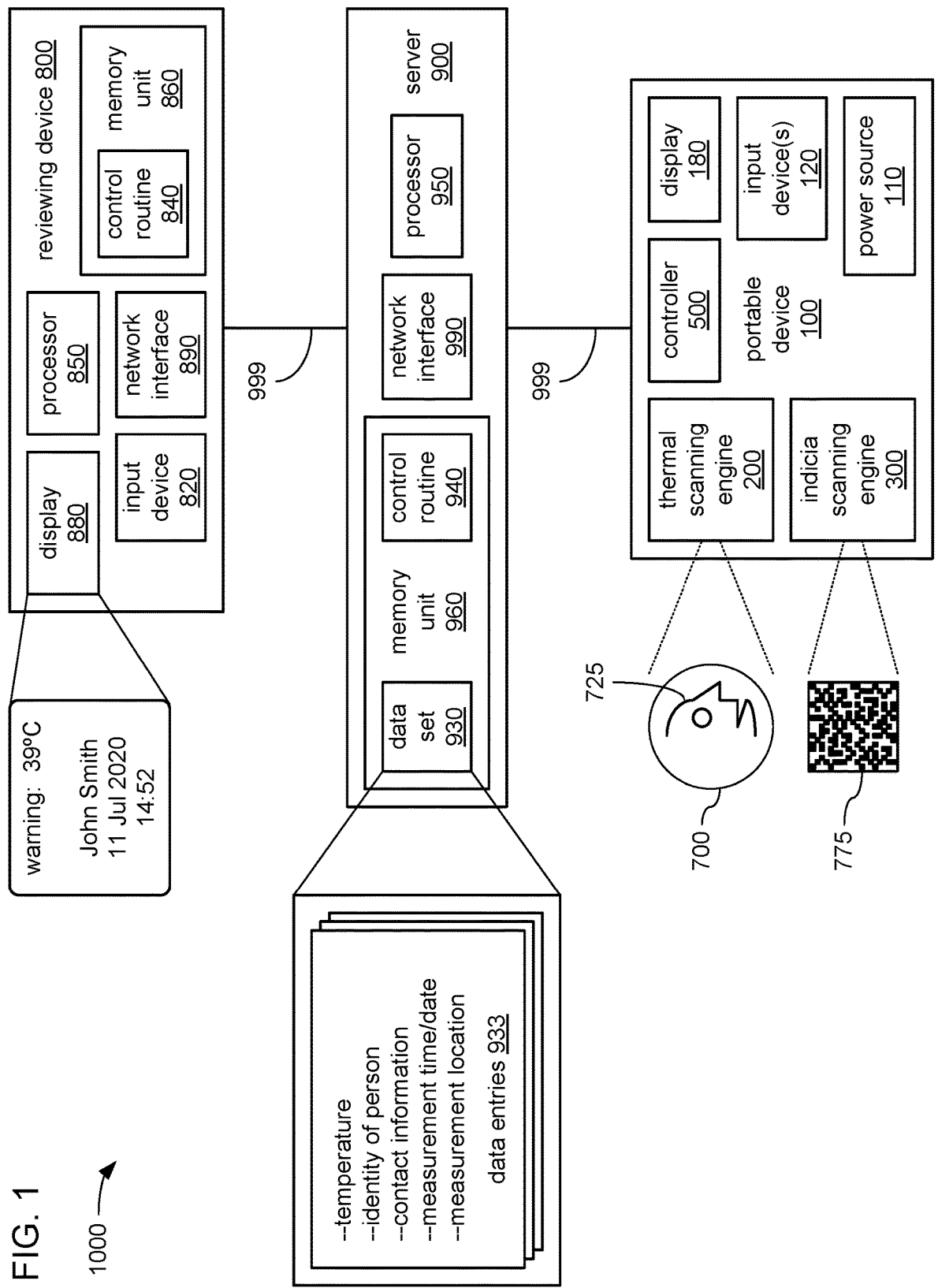
FIG. 1 shows aspects of example processing system for collecting, storing and review of data provided by a portable device that combines an indicia scanner and contactless thermometer.

In the following detailed description, reference is made to the accompanying drawings that form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Disclosed herein is a portable device operable to perform the functions of both a portable indicia scanner and a portable contactless thermometer. Also disclosed herein is a processing system including such a portable device to enable collection, storage and evaluation of both data decoded from indicia scanned by the portable device and data indicative of temperatures measured by the portable device.

A scanning device includes: a motion sensor configured to detect motion imparted to the scanning device; a distance detector configured to determine a distance between the scanning device and a surface; an infrared detector configured to capture a temperature of the surface; an image sensor configured to capture an image of an indicia that encodes data on the surface; and a processor coupled to at least a storage configured to store the captured image and the captured temperature. The processor is configured to: operate the motion sensor to detect motion being imparted to the scanning device when the scanning device is in a low power state; and in response to the detection of motion being imparted to the scanning device, the processor is further configured to transition the scanning device out of the low power state by performance of operations including operate the distance detector to determine the distance between the scanning device and the surface, and determine, based at least on the distance between the scanning device and the surface, whether to operate the infrared detector to capture the temperature of the surface, and whether to operate the image sensor to capture the image of the indicia.

A method includes operating a motion sensor of a scanning device to detect motion being imparted to the scanning device when the scanning device is in a low power state. The method also includes, in response to the detection of motion being imparted to the device, transitioning the device out of the low power state by performing operations including: operating a distance detector of the scanning device to determine the distance between the scanning device and a surface; and determining, by a processor of the scanning device, and based at least on the distance between the scanning device and the surface, whether to operate an infrared detector of the scanning device to capture a temperature of the surface, and whether to operate an image sensor of the scanning device to capture an image of an indicia that encodes data on the surface.

FIG. 1 depicts aspects of an example embodiment of a processing system 1000 that may include at least one portable device 100 coupled by a network 999 (e.g., cable-based and/or wireless links interconnecting devices) to a server 900, which in turn, may be coupled to still another device through the network 999, such as the depicted reviewing device 800. FIGS. 2A-E, together, depict aspects of example embodiments of the portable device 100. As will be explained in greater detail, the portable device 100 may capture and decode images of encoded data markings carried on surface(s) of objects, such as indicia, digital watermarks and/or human-readable text. Additionally, and as will also be explained in greater detail, the portable device 100 may alternately capture a measurement of the temperature of a surface of an object in a contactless manner such that no portion of the portable device 100 need make physical contact therewith. Also, the portable device 100 may subsequently transmit data decoded from the indicia and/or data indicative of the measured temperature to another device, such as one of the server 900, via the network 999. Further, the reviewing device 800 may be operated to access data that is stored within the server 900 from numerous instances of the scanning and decoding of indicia and/or numerous instances of the contactless measurement of temperatures for purposes of analysis and/or review. As will further be explained in greater detail, the portable device 100 may transmit, to the server 900, data correlating contactless temperature measurements to indications of time and/or place at which those temperature measurements took place, and/or indications of personal information concerning a person (e.g., the person's identity) associated with the temperature measurement. Such indications of time and/or places, and/or such indications of personal information of a person, may include data decoded from scanned indicia in instances where both indicia scanning and temperature measurement functions of the portable device 100 are advantageously used in combination.

Figure 2A:
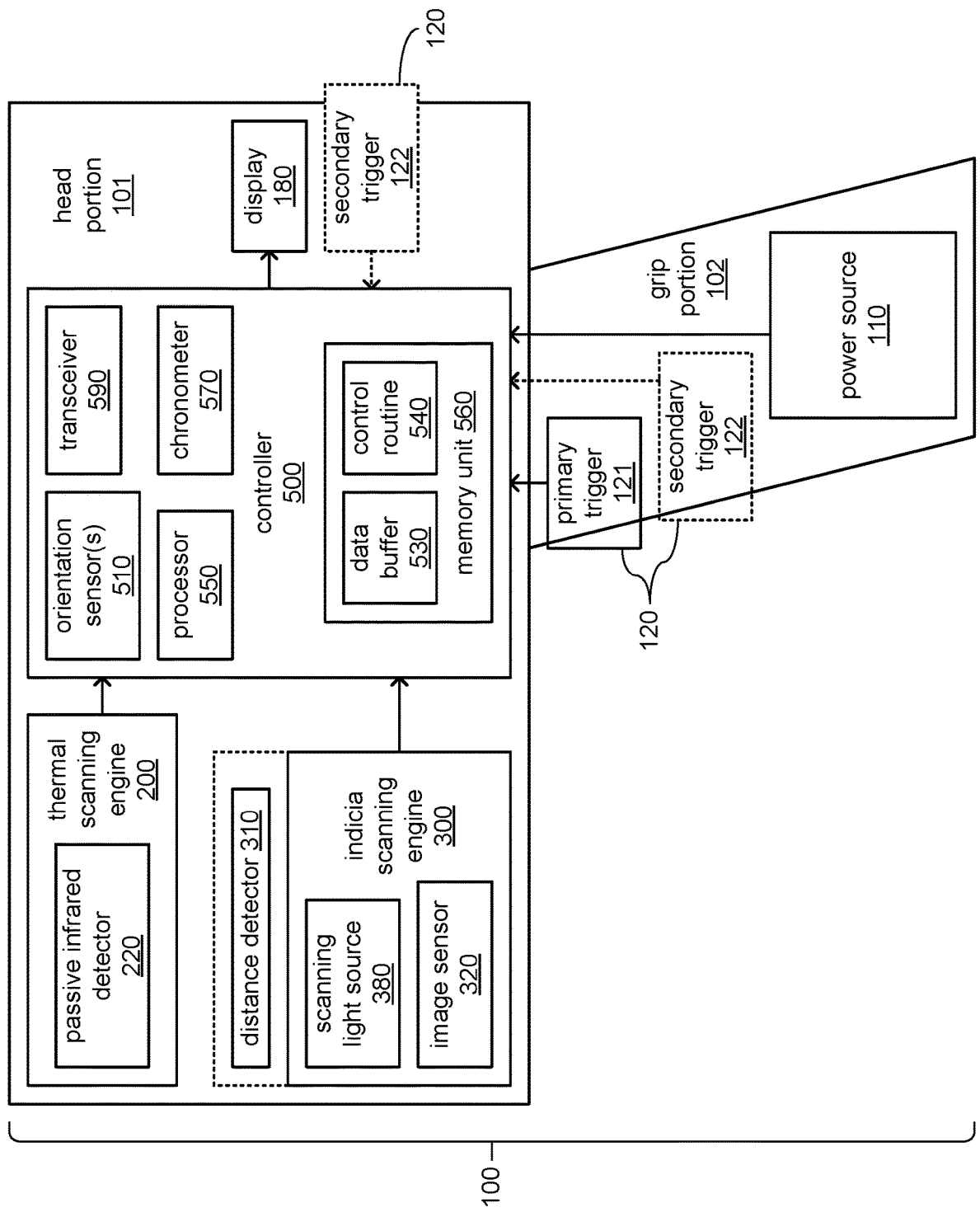
Figure 2B:
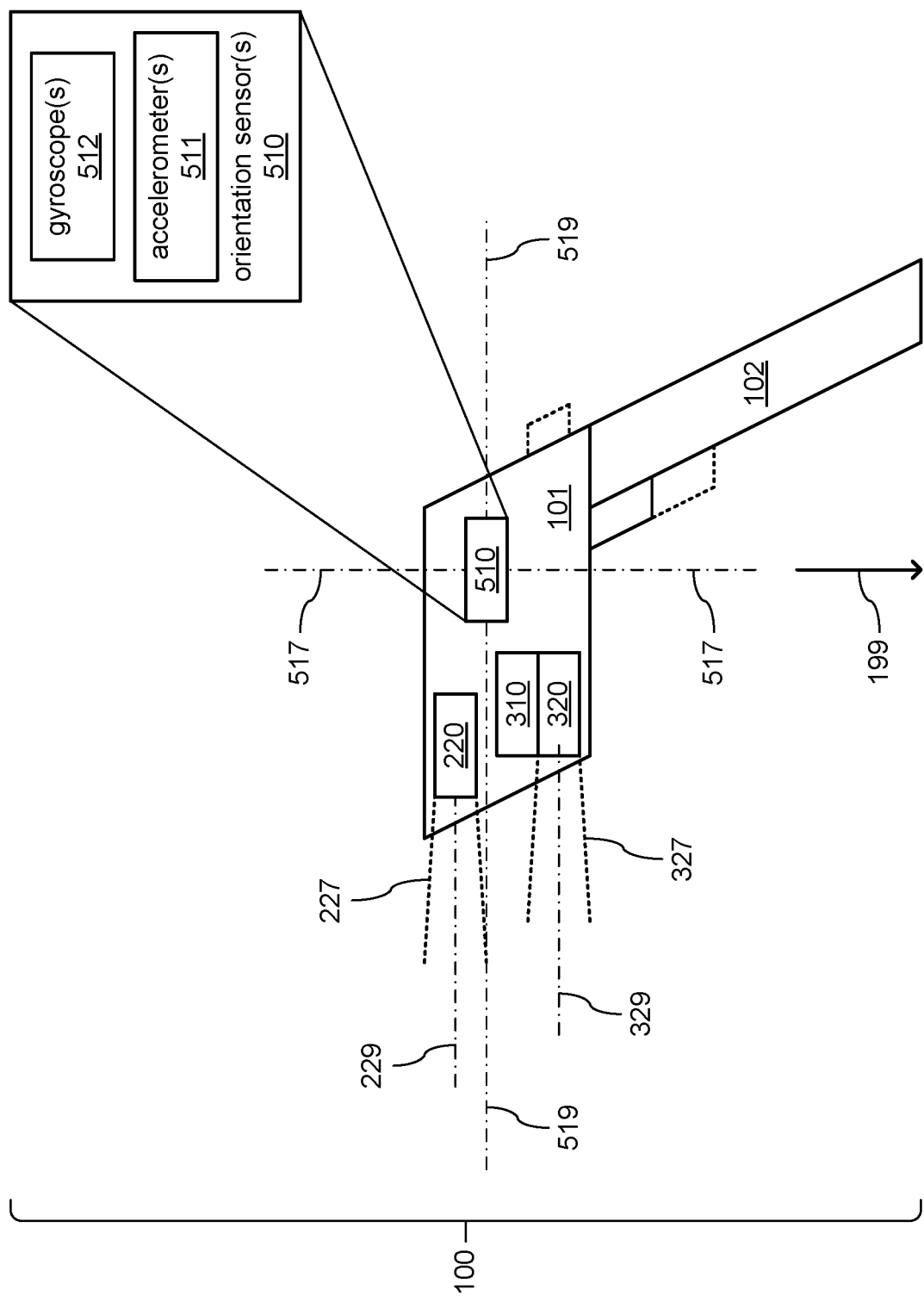
Figure 2D:
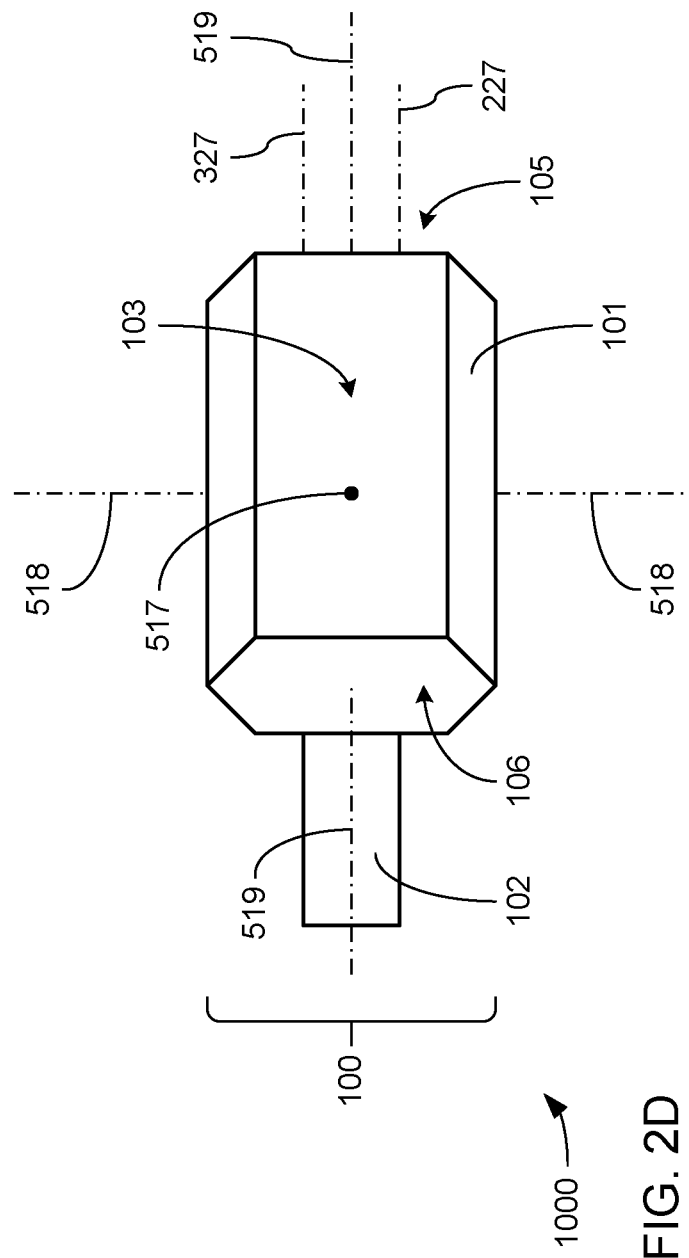

Referring to FIG. 1 together with FIGS. 2A-B, the portable device 100 may include a portable power source 110, one or more input devices 120, a display 180, a thermal scanning engine 200, an indicia scanning engine 300 and/or a controller 500. The one or more input devices 120 may include a primary trigger 121 and/or a secondary trigger 122. The thermal scanning engine 200 may include a passive infrared detector. The indicia scanning engine 300 may include a distance detector 310, an image sensor 320 and/or a scanning light source 380. The controller 500 may include one or more orientation sensors 510, a processor 550, a memory unit 560, a chronometer 570 and/or a transceiver 590 that may serve to couple the portable device 100 to the network 999. The processor 550 may incorporate one or more core components, one or more graphics processing unit (GPU) components, one or more single-instruction multiple-data (SIMD) components, and/or one or more direct memory access (DMA) components to provide any of a variety of processing architectures for performing any of a variety of operations. The memory unit 560 may store one or more of a data buffer 530 and a control routine 540. The one or more orientation sensors 510 may include one or more accelerometers 511, and/or one or more gyroscopes 512.

Within the portable device 100, the thermal scanning engine 200 (including the passive infrared detector 220), the indicia scanning engine 300 (including the distance detector 310, the image sensor 320 and the scanning light source 380), the display 180, and the one or more input devices 120 may each be communicatively coupled to the controller 500 (including the processor 550 therein) to exchange data therewith through the exchange of electrical, optical, magnetic and/or other signals through one or more buses and/or other form of interconnect. Similarly, within the transceiver 590, the chronometer 570, the memory unit 560, and the one or more orientation sensors 510 (including the one or more accelerometers 511 and/or the one or more gyroscopes 512 therein) may each be communicatively coupled to the processor 550 within the controller 500 to exchange data therewith through the exchange of electrical, optical, magnetic and/or other signals through one or more buses and/or other form of interconnect.

Referring to FIGS. 2B-E, the portable device 100 may include a casing that is shaped to give the portable device 100 a generally "pistol-like" physical configuration that includes a generally elongate head portion 101 and a generally elongate grip portion 102. As depicted, an upper end of the grip portion 102 may formed integrally with or otherwise meet with a bottom surface 104 of the head portion 101 at an angle and at a location along the length of the head portion 101 (from a front end 105 to a back end 106) that serves to create the pistol-like physical configuration. In some embodiments, the portable power source 110 may include a battery carried within the bottom end of the grip portion 102 that is opposite the upper end that meets with the bottom surface 104 of the head portion 101. Such a battery may be shaped, sized and/or otherwise physically configured to be insertable into and removable from the lower end of the grip portion 102 in a manner that may resemble a magazine that is configured to be insertable into and removable from a similar portion of the grip of a pistol.

The primary trigger 121 may be carried by grip portion 102 at a location near where the upper end of the grip portion 102 and the bottom surface 104 of the head portion 101 are connected, thereby placing the primary trigger 121 at a location similar to where a trigger would be located on the grip of a pistol. At such a location, the primary trigger 121 may be operable by an index finger when the grip portion 102 is gripped by a hand in a manner similar to how the grip of a pistol would be gripped. The secondary trigger 122 may be carried by the grip portion 102 at a location adjacent to the primary trigger 121 at a location that renders the secondary trigger 122 operable by the finger adjacent to the index finger when the grip portion 102 is gripped by a hand in a manner similar to how the grip of a pistol would be gripped. Alternatively, the secondary trigger 122 may be carried on the back end 106 of the head portion 101 at a location similar to where a hammer would be located at the rear of a pistol, above the grip. At such a location, the secondary trigger 122 may be operable by a thumb when the grip portion 102 is gripped by a hand in a manner similar to how the grip of a pistol would be gripped.

A forward-rearward axis 519 may extend along the elongate dimension of the head portion 101 of the portable device 100 such that the forward-rearward axis 519 may extend through the front end 105 and the back end 106. More specifically, the forward-rearward axis 519 may be positioned and oriented relative to the grip portion 102 in a manner that would cause it to extend along (or at least parallel to) the path of travel of a bullet leaving a pistol if the grip portion 102 was the grip of that pistol. An upward-downward axis 517 may extend across, and at a right angle to, the forward-rearward axis 519 such that the upward-downward axis 517 extends through the bottom surface 104 and a top surface 103 of the head portion 101. With the portable device 100 held by grip portion 102 in a manner similar to how a pistol would be held to fire a level shot, such that the bottom surface 104 faces downwardly and an opposing top surface 103 of the head portion 101 faces upwardly, the upward-downward axis 517 may extend downward in the direction of the force of gravity of the Earth, as indicated by an arrow 199. A side-to-side axis 518 may extend across, and at right angles to, both the forward-rearward axis 519 and the upward-downward axis 517. As will be explained in greater detail, at least one of the one or more orientation sensors 510 may be operable to monitor the orientation of one or more of these axes 517, 518 and 519 relative to the vertical orientation (downward direction indicated by arrow 199) of the force of gravity of the Earth.

The passive infrared detector 220 of the thermal scanning engine 200 may have a field of view (FOV) 227 that extends along an axis 229 that is either coincident with, or is parallel to, the forward-rearward axis 519 extending further forward of the front end 105 of the head portion 101. Similarly, the image sensor 320 of the indicia scanning engine 300 may have an FOV 327 that extends along an axis 329 that is also either coincident with, or is parallel to, the same portion of the forward-rearward axis 519. The scanning light source 380 may be oriented within the head portion 101 to project light in a direction that is generally along the same portion of the forward-rearward axis 519 to illuminate a surface positioned in front of the head portion 101 along the forward-rearward axis 519. Similarly, the distance detector 310 may be oriented within the head portion 101 to measure a distance from front end 105 of the head portion 101 to a surface along the axis 519.

Though not specifically depicted, in some embodiments, as an alternative to, or in addition to, use of the indicia scanning engine 300 to capture images of indicia to be decoded, the transceiver 590 may be operated to exchange near field radio and/or other electromagnetic signals with radio-frequency identification (RFID) tags, and/or may be other operated to exchange radio signals conforming to the Bluetooth Specification with still other devices. Such communications may be used in addition to, or in lieu of, the optical scanning of indicia to obtain information from various objects. As will be familiar to those skilled in the art, RFID tags and/or devices engaging in Bluetooth-compliant communications may be adhered to, or otherwise incorporated into any of a variety of objects.

Figure 2E:
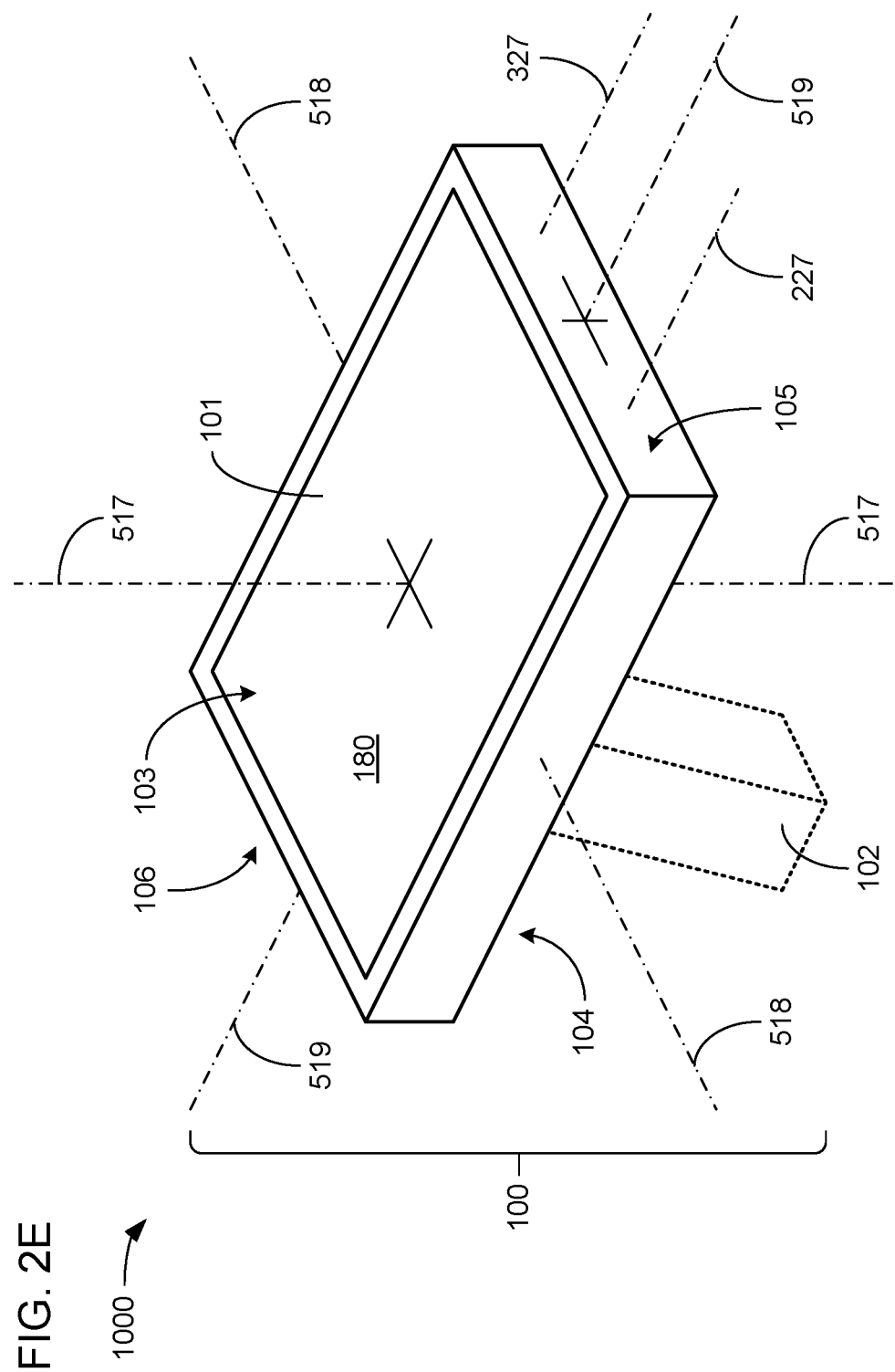

Referring more specifically to FIG. 2E, in some embodiments, it may be that the grip portion 102 is implemented as an optional attachment that may be removably connectable to the bottom surface 104 of the head portion 101. In some of such embodiments, the head portion 101 may be implemented as a fully complete portable computing device having a configuration very much like what has become commonplace in the physical configuration of typical "smart phones" in which the display 180 may make up much of the top surface 103. Further, the display 180 may be a touchscreen, which may obviate the need for separate and distinct input devices 120 such as either of the triggers 121 or 122. As will be familiar to those skilled in the art, a touchscreen version of the display 180 may be used to provide virtual versions of one or both of the triggers 121 and 122 such that the need for distinct switch components to provide either or both of the triggers 121 and 122 is obviated. Still, the ability to temporarily attach the grip portion 102 to the bottom surface 104 may provide the ability to temporarily add one or both of triggers 121 and 122 in a form that is integrated into the grip portion 102.

Referring again to FIG. 1, along with all of FIGS. 2A-E, the server 900 may include a processor 950, a memory unit 960 and a network interface 990 that may serve to couple the server 900 to the network 999. The processor 950 may incorporate one or more core components, one or more graphics processing unit (GPU) components, one or more single-instruction multiple-data (SIMD) components, and/or one or more direct memory access (DMA) components to provide any of a variety of processing architectures for performing any of a variety of operations. The memory unit 960 may store one or more of a data set 930 and a control routine 940.

The reviewing device 800 may include an input device 820, a display 880, a processor 850, a memory unit 860 and a network interface 890 that may serve to couple the reviewing device 800 to the network 999. The processor 850 may incorporate one or more core components, one or more graphics processing unit (GPU) components, one or more single-instruction multiple-data (SIMD) components, and/or one or more direct memory access (DMA) components to provide any of a variety of processing architectures for performing any of a variety of operations. The memory unit 860 may store a control routine 840.

Each of the control routines 540, 840 and 940 may incorporate a sequence of instructions operative on corresponding ones of the processors 550, 850 and 950 to implement logic to perform various functions. As will be explained in greater detail, in different embodiments, different ones of the processors 550, 850 and 950 may be employed in executing different portions of, and/or different ones of, the control routines 540, 840 and 940 to perform different ones of those various functions.

Within the portable device 100, in executing the control routine 540, the processor 550 within the controller 500 thereof may be caused to implement at least a low power mode and a high power mode. Transitions between these two modes may be made based on such factors as the detection of movement being imparted to the portable device 100 and the detection of operation of the portable device 100. More specifically, in response to the passage of a period of activity of at least a predetermined amount of time in length, the processor 550 may be caused to transition the portable device 100 into the low power mode in which the amount of electric power consumed from the portable power source 110 (which again, may be a battery) is minimized. By way of example, the processor 550 may be caused to reduce its own power consumption by not operating continuously and/or by operating at a lower clock frequency. Alternatively or additionally, various components associated with using the portable device 100 to scan indicia and/or measure a temperature may be powered down, including and not limited to, the display 180, the thermal scanning engine 200, and/or the indicia scanning engine 300. Also, alternatively or additionally, the operations performed by the processor 550 during the low power mode may be minimized and may include mostly operating the one or more orientation sensor(s) 510 to detect an indication of movement being imparted to the portable device 100. Such an indication may be a detected change in inertia, or a change in orientation and/or location relative to the direction of the force of gravity, of the portable device 100 that is consistent with the onset of movement being imparted to the portable device 100 after having been allowed to remain stationary for at least a long enough period of time as to have triggered entry into the low power mode.

In response to receiving such an indication that movement has been imparted to the portable device 100, the processor 550 may be caused by further execution of the control routine 540 to transition the portable device 100 into the high power mode. In so doing, the processor 550 may be caused to operate one or more of the thermal scanning engine 200, the indicia scanning engine 300 (e.g., the distance detector 310 thereof), and/or the transceiver 590 to perform various operations to determine whether the portable device 100 is now being operated to perform either a scan of an indicia or a contactless measurement of a temperature, and/or as well as to make an automatic determination of which of these two functions the portable device 100 is now being operated to perform. As will be readily recognized by those skilled in the art, operating at least a subset of these components 200, 300, 310 and 590 requires the consumption of additional electrical energy from the portable power source 110. As a result, at least a subset of these components may have had power removed therefrom and/or at least have not been operated to perform any function during the low power mode.

More specifically, in some embodiments, as part of transitioning the portable device 100 into the high power mode, the processor 550 may operate the distance detector 310 to attempt to determine a current distance to a surface that may be at a position in front of the front end 105 of the head portion 101 of the portable device 100 and along the axis 519. In various embodiments, the distance detector 310 may or may not be integrated into the indicia scanning engine 300. Regardless, the distance detector 310 may be independently operable to be caused to emit sound (e.g., ultrasonic sound), light (e.g., a beam of infrared light), radio waves, etc. along (or parallel to) the axis 519 toward what may be a surface positioned along the axis 519, and may monitor for a reflection of such an emission back to the distance detector 310 from such a surface to determine the distance between the front end 105 of the head portion 101 of the portable device 100 to that surface along the axis 519. Again, as will be recognized by those skilled in the art, such an emission requires the expenditure of electrical energy, and therefore, may not be performed at all during the low power mode. As will be discussed in more detail, the processor 550 may be caused to determine further operations to perform based on whether a surface is detected by the distance detector 310 as being present along the axis 519 (e.g., whether the distance detector 310 receives any reflection along the axis 519), and/or based on the length of the distance that may be detected between the front end 105 of the head portion 101 of the portable device 100 and a surface along the axis 519.

Alternatively or additionally, as part of transitioning the portable device 100 into the high power mode, the processor 550 may operate the one or more orientation sensors 510 to determine a current orientation of the axis 519 relative to the vertical direction of the force of gravity of the Earth. As will be familiar to those skilled in the art, each of the one or more accelerometers 511, and/or each of the one or more gyroscopes 512 may be implemented using any of a variety of technologies, including and not limited to, micro-electromechanical systems (MEMS) technology in which such components may be fabricated using techniques similar to those applied to the manufacture of integrated circuits. Again, as will be recognized by those skilled in the art, regardless of the exact technology employed by each of the one or more orientation sensors 510, such operation of such components to determine an orientation of an axis (e.g. one or more of the axes 517, 518 and 519) requires the expenditure of electrical energy, and therefore, may not be performed at all during the low power mode. As will be discussed in more detail, the processor 550 may be caused to determine further operations to perform based on the orientation of one or more of the axes 517, 518 and 519 relative to the vertical direction of the force of gravity of the Earth. By way of example, the processor 550 may be caused to determine which one(s) of the axes 517, 518 and/or 519 is oriented within a predetermined degree of normal to, and/or within a predetermined degree of alignment with, the vertical direction of the force of gravity of the Earth such that one or more of the axes 517, 518 and/or 519 may be oriented within a predetermined degree of horizontal and/or within a predetermined degree of vertical.

Also alternatively or additionally, as part of transitioning the portable device 100 into the high power mode, the processor 550 may operate at least the image sensor 320 of the indicia scanning engine 300 to capture an image of what may be a portion of a surface within its FOV 327 along the axis 519 to determine whether that portion of that surface carries an indicia 775. The image sensor 320 may be based on any of a variety of technologies and may employ any of a variety of optical scanning and/or other image capturing techniques to capture an image of an indicia 775 (e.g., bar codes, digital watermarks, text, etc.) carried by a portion of a surface of an object. More specifically, the image sensor 320 may include any of a variety of light sensing components to effect the capture of an image that may include encoded data markings, including and not limited to, a charge-coupled device (CCD) or complementary metal-oxide-semiconductor (CMOS) sensor providing a single row of individual light sensors operated in a manner that sweeps over encoded data markings to perform a scan thereof, or a CCD or CMOS sensor providing a two-dimensional (2D) array of individual light sensors to capture a 2D image of one or more encoded data markings.

As will be familiar to those skilled in the art, the capturing of an image of a portion of a surface of an object requires the presence of light that may be visible to the human eye (e.g., white light, or light within the spectrum of colors visible to the human eye), and/or that may not be visible to the human eye (e.g., infrared or ultraviolet light). Alternatively or additionally, and depending on the technology on which the image sensor 320 is based, light having one or more specific characteristics (e.g., collimated light, light of a particular frequency or range of frequencies, etc.) may be required. At the time the image sensor 320 is so operated by the processor 550, there may be insufficient ambient light, and/or insufficient light having such one or more specific characteristics, such that the scanning light source 380 may also need to be operated to emit light in a direction along the axis 519 that is sufficient to illuminate a portion of a surface that may carry an indicia 775 such that the image sensor 320 is able to be operated to successfully capture an image of such an indicia 775 (if present). Again, as will be recognized by those skilled in the art, such operation of an image sensor to capture an image and such an emission of light requires the expenditure of electrical energy, and therefore, neither such operation of the image sensor 320 or of the scanning light source 380 may not be performed at all during the low power mode.

Following such operation of the image sensor 320 and/or of the scanning light source 380 to capture an image of what may be a portion of a surface within the FOV 327 that may or may not carry an indicia 775, the processor 550 may be further caused by the control routine 540 to perform processing operations with the captured image to determine whether the image has characteristics consistent with an indicia 775 having been captured therein (e.g., whether there is a set of closely spaced light-to-dark and dark-to-light transitions consistent with a bar code, text, etc.). As will be recognized by those skilled in the art, the performance of such processing operations also requires the expenditure of electrical energy, and therefore, such processing operations may not be performed at all during the low power mode. As will be discussed in more detail, the processor 550 may be caused to determine further operations to perform based on whether or not such indications consistent with an indicia 775 are found to be present within the captured image.

Still also alternatively or additionally, as part of transitioning the portable device 100 into the high power mode, the processor 550 may monitor the state of the one or more input devices 120 to determine whether any of the one or more input devices 120 have been operated to provide operator input to the portable device 100. The electrical signal emanating from each of the one or more input devices 120 may be subjected to hardware-based and/or software-implemented debouncing to remove incidents of spikes and/or troughs in such signals that may provide a false indication of multiple instances of manual operation where just one instance of manual operation may have occurred. As will be recognized by those skilled in the art, both monitoring the state of the one or more input devices 120 and the implementation of either form of debouncing requires the expenditure of electrical energy, and therefore, such operations may not be performed at all during the low power mode. As will be discussed in more detail, the processor 550 may be caused to determine further operations to perform based on whether or not any of the one or more input devices 120 has been manually operated. In embodiments in which there is more than one input device 120 (e.g., where there is both the primary trigger 121 and a secondary trigger 122), the processor 550 may also be caused to make such a determination based on which one(s) of such multiple input devices 120 have been operated.

More broadly, and as will be explained in greater detail, the processor 550 may employ such indications as whether a surface is present in front of the portable device 100 along the axis 519, how far such a surface (if present) is from the portable device 100, whether such a surface (if present) appears to carry an indicia 775, the orientation of the axis 519, whether one or more input devices 120 have been operated, and/or which input device(s) 120 (if there are multiple ones) have been operated in determining what further operations are to be performed. Among such operations may be measuring a temperature of a surface positioned along the axis 519, capturing an (or another) image of a portion of a surface along the axis 519, performing processing operations to locate and decode an indicia 775 that may be carried thereon, obtaining indications of current time and/or place from an operator of the portable device 100 and/or other source(s), transmitting data indicative of a temperature measurement and/or data decoded from an indicia to another device (e.g., the server 900) via the network 999, transmitting metadata indicative of where and/or when temperature measurements took place to another device (e.g., the server 900) via the network 999, and/or transitioning the portable device 100 back into the low power mode.

Within the server 900, in executing the control routine 940, the processor 950 may be caused to operate the network interface 990 to monitor for transmissions of data conveying temperature measurements of surfaces of objects and/or data decoded from indicia 775 captured in images. The processor 950 may be caused to store such data as part of the data set 930 which may take the form of a log or database of entries 933 that each correspond to an instance of the receipt of such data. In some embodiments, the server 900 may be operated by a governmental public health agency and/or other institution with a connection to the field of public health for the purpose of collecting data concerning at least temperature measurements of members of the public for purposes of tracking changes in the health of a population. In such embodiments, and as will be explained in greater detail, it may be that the portable device 100 (or each of multiple ones thereof) provides at least data indicative of temperature measurements to the server 900 accompanied by metadata indicative of the time and/or place at which each of those temperature measurements took place, and/or metadata indicative of personal information of a person associated with the temperature measurement (e.g., the identity of a person where the temperature of their forehead has been contactless measured). The processor 950 may be caused to use such metadata to organize and/or index the entries 933 to enable the retrieval of subsets of the entries 933 based on temperature, time, date, location, identity of a person, age and/or gender of a person, connection of a person with one or more group(s) of people (e.g., their nationality, religion, race, etc.), occupation and/or employer of a person, etc.

Within the reviewing device 800, in executing the control routine 840, the processor 850 may be caused to operate the input device 820 and/or the display 880 to provide a user interface by which an operator of the reviewing device 800 may provide commands to access the data set 930 stored within server 900. Such commands may include specifications of a subset of the temperature data stored therein to be retrieved based on range of temperatures, time, date, location, age and/or gender of people, race or ethnicity of people, employer and/or industry of people, education level and/or occupation of people, affiliation of people with one or more groups, etc. Alternatively or additionally, such commands may include specifications for the manner in which the temperature data is to be organized for access based on such attributes. In response to the receipt of such commands via such a provided user interface, the processor 850 may be caused by the control routine 840 to operate the network interface 890 transmit a corresponding request to the server 900 via the network 999 for such access to the data set 930. In some embodiments, the reviewing device 800 may be operated by a doctor, scientist or other researcher associated with a governmental public health agency and/or other institution with a connection to the field of public health for the purpose of modeling and/or performing analyses on at least temperature measurements of members of the public for purposes of deriving various insights into the health of a population (e.g., looking for signs of an outbreak of a disease condition and/or extent of spread thereof). In some of such embodiments, such insights may be sought to identify instances of lack of compliance with ordinances, laws and/or other government-issued orders concerning the movements and/or other activities of persons who may be capable of spreading an infection, etc.

In some embodiments, the processor 850 may be caused to operate the display 880 to provide a visual warning of an instance of a temperature that has been measured from a person 700 that is high enough to indicate a health concern. Part of such a visual warning may include an indication retrieved from the pertinent entry 933 of the data set 930 of the identity of the person 700 associated with such a high temperatures and/or an indication of the time and/or place at which that high temperature was captured through contactless measurement. In some of such embodiments, such visual warnings may be visually presented on the display 880 as part of whatever data has been requested to be retrieved. Alternatively or additionally, in others of such embodiments, such visual warnings may be preemptively transmitted to the reviewing device 800 from the server 900 as a result of the processor 950 of the server being caused by the control routine 940 to preemptively transmit indications that data concerning such high temperatures has been received by the server 900. Such preemptive provision of such warnings may be deemed desirable to provide as early an indication as possible of persons 700 having been found to have such high temperatures to public health personnel and/or others involved in the maintenance of public health and/or the provision of health care. Regardless of whether such a warning is presented preemptively or as part of a response to a query, such a visual warning may be accompanied by an audible warning.

Each of the processors 550, 850 and/or 950 may include any of a wide variety of processors, microcontrollers, gate-array logic devices, etc. that may be incorporate any of a variety of features to enhance speed and/or efficiency of processing operations. Such features may include and are not limited to, multi-threading support per core component, multiple processing core components, directly integrated memory control functionality, and/or various modes of operation by which speed of throughput and/or level of power consumption may be dynamically altered.

Each of the processors 550, 850 and/or 950 may be implemented as a single semiconductor die within a single package. Alternatively, each processor 550, 850 and/or 950 may be implemented as multiple semiconductor dies incorporated into a single package, such as a multi-chip semiconductor package (e.g., a system-on-a-chip, or SOC) in which the multiple semiconductor dies may be interconnected in any of a variety of ways, including and not limited to, conductive wires extending between adjacent semiconductor dies, and/or a substrate formed from multiple layers of conductors separated by intervening layers of insulating material (e.g., a printed circuit board, or PCB) onto which the multiple semiconductor dies may be soldered.

Each of the storages 560, 860 and/or 960 may be based on any of a variety of volatile storage technologies, including and are not limited to, random-access memory (RAM), dynamic RAM (DRAM), Double-Data-Rate DRAM (DDR-DRAM), synchronous DRAM (SDRAM), static RAM (SRAM), etc. Alternatively or additionally, the storage 360 may be based on any of a variety of non-volatile storage technologies.

Each of the network interfaces 590, 890 and 990 may employ any of a variety of wireless communications technologies, including and not limited to, radio frequency transmission, transmission incorporated into electromagnetic fields by which electric power may be wirelessly conveyed, and/or any of a variety of types of optical transmission. Additionally, each of the network interfaces 190 and 590 may be configured to engage in communications that adhere in timings, protocol and/or in other aspects to one or more known and widely used standards, including and not limited to IEEE 802.11a, 802.11ad, 802.11ah, 802.11ax, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1×RTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

The indicia 775 that may be present on a portion of a surface of an object may be any of a variety of forms of 1D optically readable indicia (e.g., a barcode) or 2D optically readable indicia (e.g., a QR code), including and not limited to, one or more of Codabar; Code 25 (Interleaved); Code 25 (Non-interleaved); Code 11; Code 39; Code 93; Code 128; CPC Binary; DUN 14; EAN 2; EAN 5; EAN-8, EAN-13; Facing Identification Mark; GS1-128; GS1 DataBar; HIBC; Intelligent Mail barcode; ITF-14; JAN; KarTrak ACI; Latent image barcode; MSI; Pharmacode; PLANET; Plessey; Post-Bar; POSTNET; RM4SCC/KIX; Telepen; UPC; Aztec Code; Code 1; ColorCode; Color Construct Code; Cronto-Sign; CyberCode; d-touch; DataGlyphs; Data Matrix; Datastrip Code; digital paper; EZcode; Color; High Capacity Color Barcode; HueCode; InterCode; MaxiCode; MMCC; NexCode; Nintendo e-Reader; Dotcode; PDF417; QR code; ShotCode; and SPARQCode.

FIGS. 3A-H, together, depict aspects of example embodiments of operation of the portable device 100. As previously discussed, the processor 550 may perform various operations to determine various aspects of the current state of use of the portable device 100, and may respond to such determinations by taking any of a variety of actions, including and not limited to, performing the function of measuring a temperature of a portion of a surface (e.g., a surface 771 of an object 750, or the surface of a forehead 725 of a person 700) at a location along the axis 519, or performing the function of capturing and decoding an indicia 775 carried on a portion of a surface (e.g., an indicia 775 on a surface 771 of an object 750). As those skilled the art of in the art of scanning indicia will readily recognize, various safety concerns may be raised by combining these two functions into the same portable device 100.

In particular, while it may be possible to simply provide input device(s) 120 that enable an operator of the portable device 100 to manually select between these two functions, it is envisioned as being entirely possible for an operator to mistakenly operate such input device(s) 120 in a way that errantly triggers the performance of an attempted scan of an indicia 775 while the portable device 100 is positioned near the forehead 725 of a person 700 such that the illumination used in scanning an indicia 775 is accidentally directed into that person's eyes, thereby potentially causing damage to their eyesight. Thus, it may be deemed advantageous to at least reduce the likelihood of the occurrence of such events by employing the processor 550 to automatically determine (to at least some degree) which of these two functions is to be performed, and/or to automatically determine one or more aspects of their performance.

Figure 3A:
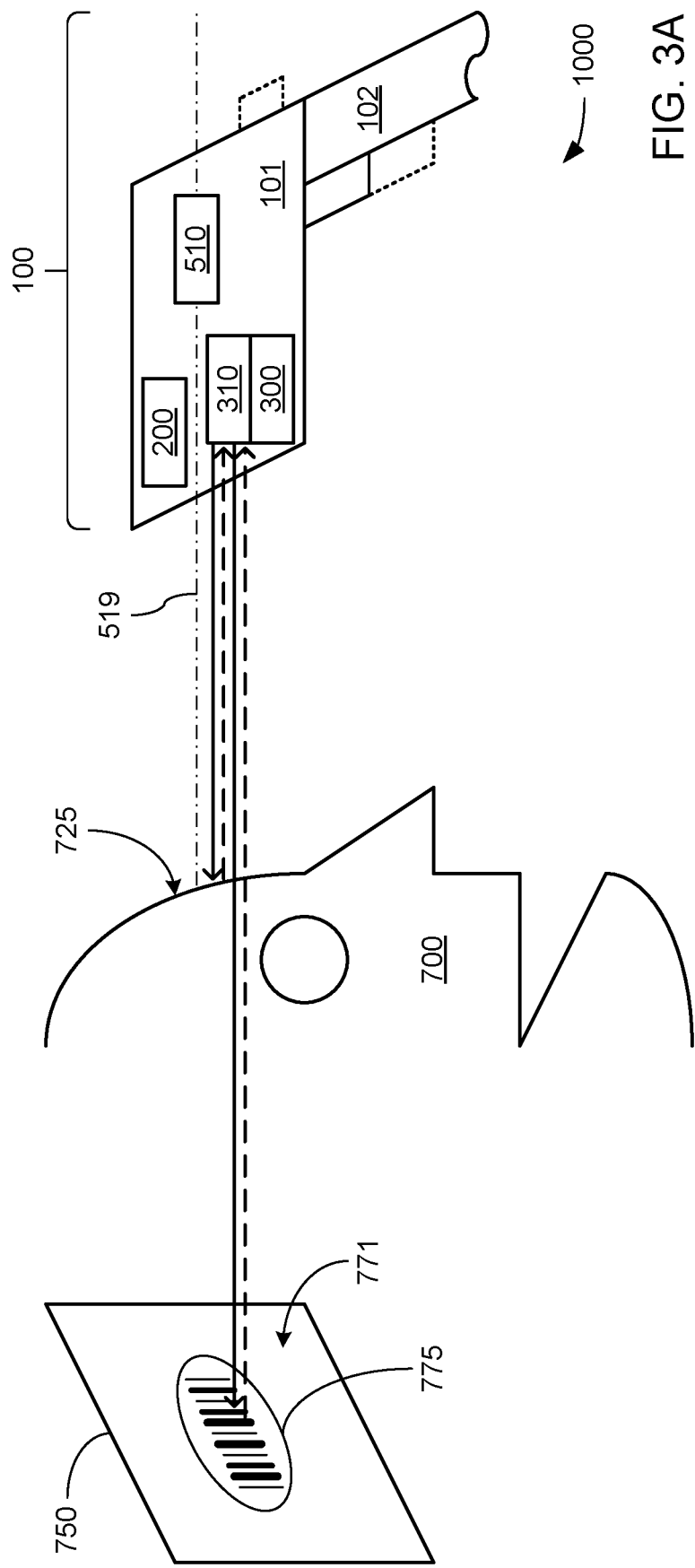

Referring to FIGS. 3A and 3B, as depicted, and as previously discussed, upon transitioning from the low power mode to the high power mode, the processor 550 may be caused to operate the distance detector 310 to attempt to measure a distance of a surface that may be present along the axis 519 from the portable device 100. As will be familiar to those skilled in the art of contactless temperature measurement, it may be that successfully measuring a temperature of a portion of a surface (e.g., the depicted surface of a forehead 725 of a person 700) requires positioning the portable device 100 within a limited range of relatively close distances to that surface. Such limitations may arise, at least in part, from the use of a passive infrared detector (e.g., the passive infrared detector 220 of the thermal scanning engine 200) which relies on detecting the radiant emission of heat energy (i.e., infrared light) from a portion of a surface as a mechanism to measure the temperature of that portion of a surface. Such radiant emissions of heat energy (especially at the levels radiating from a forehead 725 of a person 700) may be sufficiently low that successful measuring of temperature may be all too easily interfered with by the movement of air and/or other environmental factors outside of relatively short distances. Past experience and experimentation with the use of passive infrared detectors to successfully measure the temperature of a forehead 725 of a person 700 have shown that such measurements can be reliably made at distances of 10 cm or less. Thus, a shorter threshold distance that may be used in determining whether a temperature is to be measured may be 10 cm.

Figure 3C:
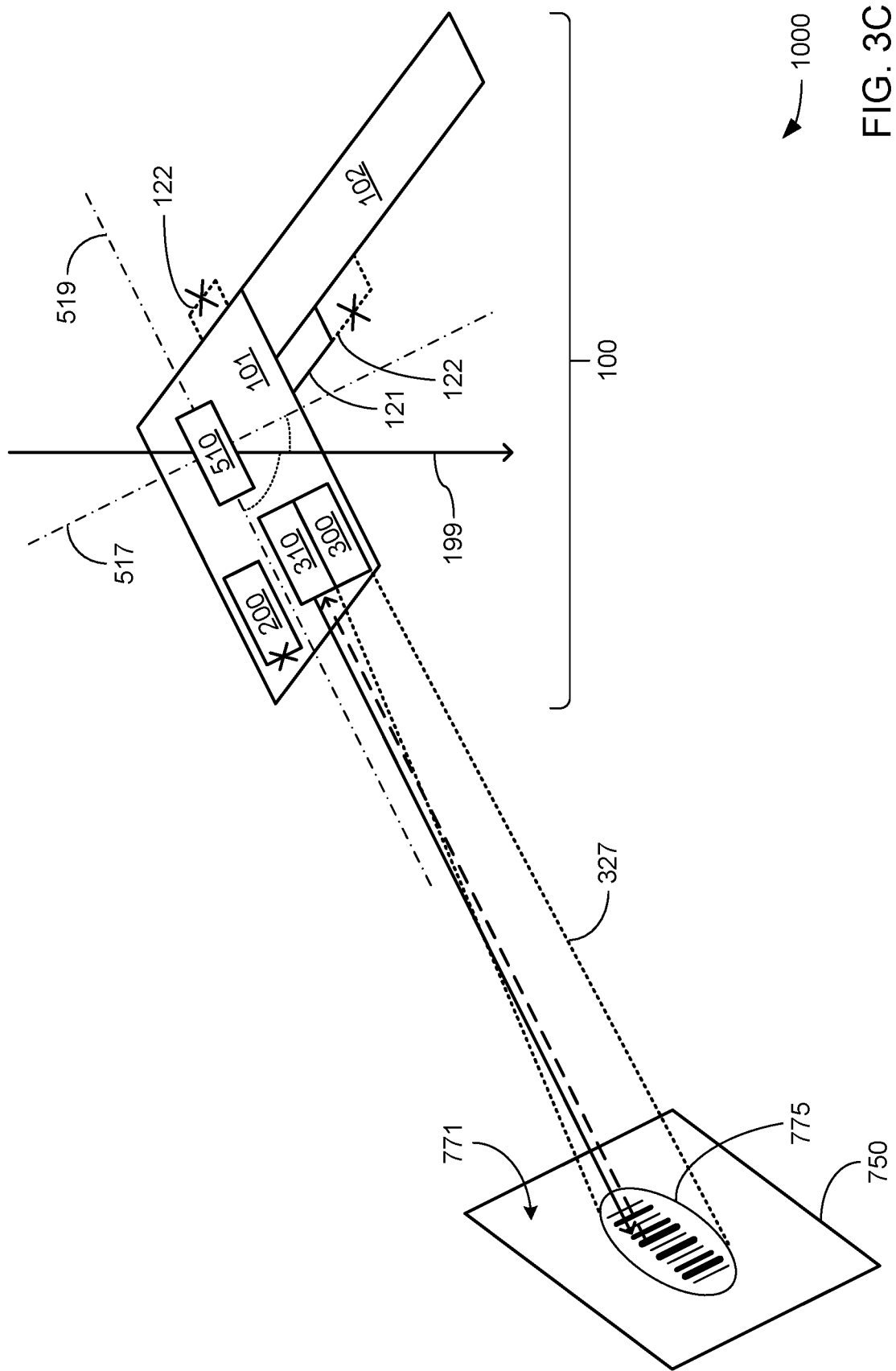

In contrast, and referring to FIGS. 3A and 3C, it may be that successfully capturing an image of an indicia 775 carried on a portion of a surface (e.g., the depicted indicia 775 on a surface 771 of an object 750) is able to be performed with the portable device 100 positioned within a wider range of distances from that surface, and such a wider range may include distances that are considerably greater than aforementioned shorter threshold distance associated with contactless temperature measurement. However, as will be familiar to those skilled in the art, although it may be possible to successfully capture an image of an indicia 775 over such a wider range of distances, there may be a need to vary the illumination used in doing so based on distance. More specifically, different levels and/or different types of illumination may be needed to capture an indicia 775 at a greater distance than at a shorter distance. For example, past experience and experimentation has shown that using, at a shorter distance, the same higher level of illumination needed at a longer distance may (under at least some circumstances) cause saturation of an image sensor (e.g., the image sensor 320 of the indicia scanning engine 300) such that an image of an indicia 775 is unable to be captured at the shorter distance. Thus, under at least some circumstances, it may not be possible to use a single level of illumination in capturing images of indicia 775 across the full range of distances that may otherwise be supported by the image sensor 320. Past experience and experimentation has shown that a threshold distance that is longer than the aforementioned shorter threshold distance may be used as a threshold in determining when to use one of two different levels of illumination in capturing an image of an indicia 775, and such past experience and experimentation has shown that such a longer threshold distance may be selected to be 30 cm.

Additionally, past experience and experimentation have shown that, at shorter distances, non-visible light (e.g., infrared light) may be used instead of visible light, and can be just as effective as visible light would be at shorter distances. Switching to using non-visible light at shorter distances (e.g., distances less than such a longer threshold distance of 30 cm) may also provide an additional element of safety in circumstances where the portable device 100 may still be inadvertently used to attempt to capture an image of an indicia 775 while in close proximity to a face of a person 700 such that the scanning light source 380 is caused to shine light into the eyes of that person 700. More specifically, the shining of non-visible light into their eyes may present less of a risk of damage to eyesight than visible light. Thus, at a distance between the portable device 100 and a surface that is less than 30 cm, the processor 550 may be caused to automatically select a lower level of illumination and/or a non-visible type of illumination to be output by the scanning light source 380 to avoid saturating the image sensor 320 and as an additional safety feature; while at a distance that is greater than 30 cm, the processor 550 may be caused to automatically select a higher level of visible illumination to be output by the scanning light source 380 to enable sufficient illumination of an indicia 775 at such a greater distance.

Thus, it may be that detecting a distance to a portion of a surface along the axis 519 that is less than the shorter threshold distance is treated by the processor 550 as a factor in determining that a temperature is to be measured, while detecting a distance to a portion of a surface along the axis 519 that is greater than the shorter threshold distance is treated by the processor 550 as a factor in determining that an indicia 775 is to be scanned and decoded. Also, it may be that detecting a distance to a portion of a surface along the axis 519 that is less than the longer threshold distance is treated by the processor 550 as a factor in determining that less illumination is to be used in capturing an image of an indicia 775, while detecting a distance to a portion of a surface along the axis 519 that is greater than the longer threshold distance is treated by the processor 550 as a factor in determining that more illumination is to be used in capturing an image of an indicia 775.

However, such use of distance as a factor in determinations by the processor 550 of which of these two functions is to be automatically selected for being performed, and/or what level and/or type of illumination is to be used in at least the capturing of images of an indicia 775, may be overridden by one or more other factors. By way of example, in some embodiments, it may be that, where a distance between the front end 105 of the head portion 101 of the portable device 100 and a surface located along the axis 519 of less than the shorter threshold distance (e.g., less than 10 cm) is detected, the processor 550 may be caused by further execution of the control routine 540 to employ an analysis of an image captured without illumination (or using a very low level of non-visible illumination) from the scanning light source 380 as an additional factor in determining whether an indicia is to be scanned or a contactless measuring of temperature is to be performed. More specifically, where a distance less than the shorter threshold distance has been detected, the processor 550 may be caused to operate the scanning light source 380 to output non-visible illumination at a very low level (e.g., pulsed) so as to at least minimize (if not eliminate) the possibility of emitting light into a person's eyes that may be damaging to their vision. Such a very low level of illumination may not be sufficient to allow an indicia 775 to be successfully captured with enough detail to enable decoding, but may still be sufficient to allow an indicia 775 to be captured with enough detail to enable the presence of its characteristic pattern of closely spaced (e.g., within a span of relatively few pixels) light-to-dark and dark-to-light transitions to be detected as present, and with less processing by the processor 550 than would be necessary to decode an indicia 775. If no such pattern of transitions between light and dark is determined to not be present, then the determination that a measurement of temperature is to be performed based on the detected distance that is less than the shorter threshold distance may remain unchanged, and a contactless temperature measurement may then be performed. However, if such a pattern is determined to be present, then the determination that a measurement of temperature is to be performed based on the detected distance that is less than the shorter threshold distance may be overridden with a determination that an indicia 775 is to be scanned, and the capture of an indicia 775 under an increased level of illumination may be performed.

Alternatively or additionally, referring to FIGS. 3B and 3C, and as previously discussed, upon transitioning from the low power mode to the high power mode, the processor 550 may be caused to operate the one or more orientation sensors 510 to determine the orientation of one or more of the axes 517, 518 and/or 519 relative to the vertical direction of the force of gravity of the Earth, which is again depicted with an arrow 199. Past experience and experimentation have shown that there is a tendency, in many settings in which contactless thermometers are used, to point a contactless thermometer at a forehead 725 of a person 700 with the head portion of the contactless thermometer oriented such that its equivalent of the axis forward-rearward 519 of the portable device 100 would be oriented to be at or close to horizontal, and such that its equivalent of the upward-downward axis 517 of the portable device 100 would be oriented to be at or close to vertical (as depicted in FIG. 3B). This seems to arise from a tendency for the operator of the contactless thermometer and the person with the forehead from which a temperature is being measured to both be standing. In contrast, past experience and experimentation have shown that there is a tendency, in many settings in which portable indicia scanning devices are used, to point such a portable indicia scanning device at an indicia 775 carried on a surface 771 of an object 750 with the head portion of the scanning device oriented such that its equivalent to the axis 519 of the portable device would be given a downward pitch such that it would be angled well away from horizontal (as depicted in FIG. 3C). This seems to arise from a tendency for the operator of such a portable scanning device to be standing while the object 750 that carries the indicia 771 is placed on a table or other surface at an elevation well below the head and arms of the operator. Thus, these two different orientations just discussed may differ simply by less than a quarter-turn rotation about the side-to-side axis 518.

In some embodiments, the processor 550 may be caused to use the orientation of the axes 517 and/or 519 detected by the one or more orientation detectors 510 as a factor in automatically determining whether to attempt a scan and decode of an indicia 775 that may be present on a portion of a surface located along the forward-rearward axis 519 (e.g., the depicted indicia 775 on the surface 771 of an object 750), or to measure a temperature of a portion of a surface located along the axis 519 (e.g., the depicted forehead 725 of a person 700). More specifically, where the forward-rearward axis 519 is detected to be within a predetermined range of degrees of being horizontal, and/or where the upward-downward axis 517 is detected to be within the predetermined range of degrees of being vertical, the processor 550 may determine that a contactless temperature measurement is to be performed. However, where the forward-rearward axis 519 is detected to be angled away from being horizontal to a degree that is outside that predetermined range of degrees of being horizontal, and/or where the upward-downward axis 517 is detected to be angled away from being vertical to a degree that is outside that predetermined range of degrees of being vertical, the processor 550 may determine that an indicia 775 is to be scanned and decoded.

Figure 3F:
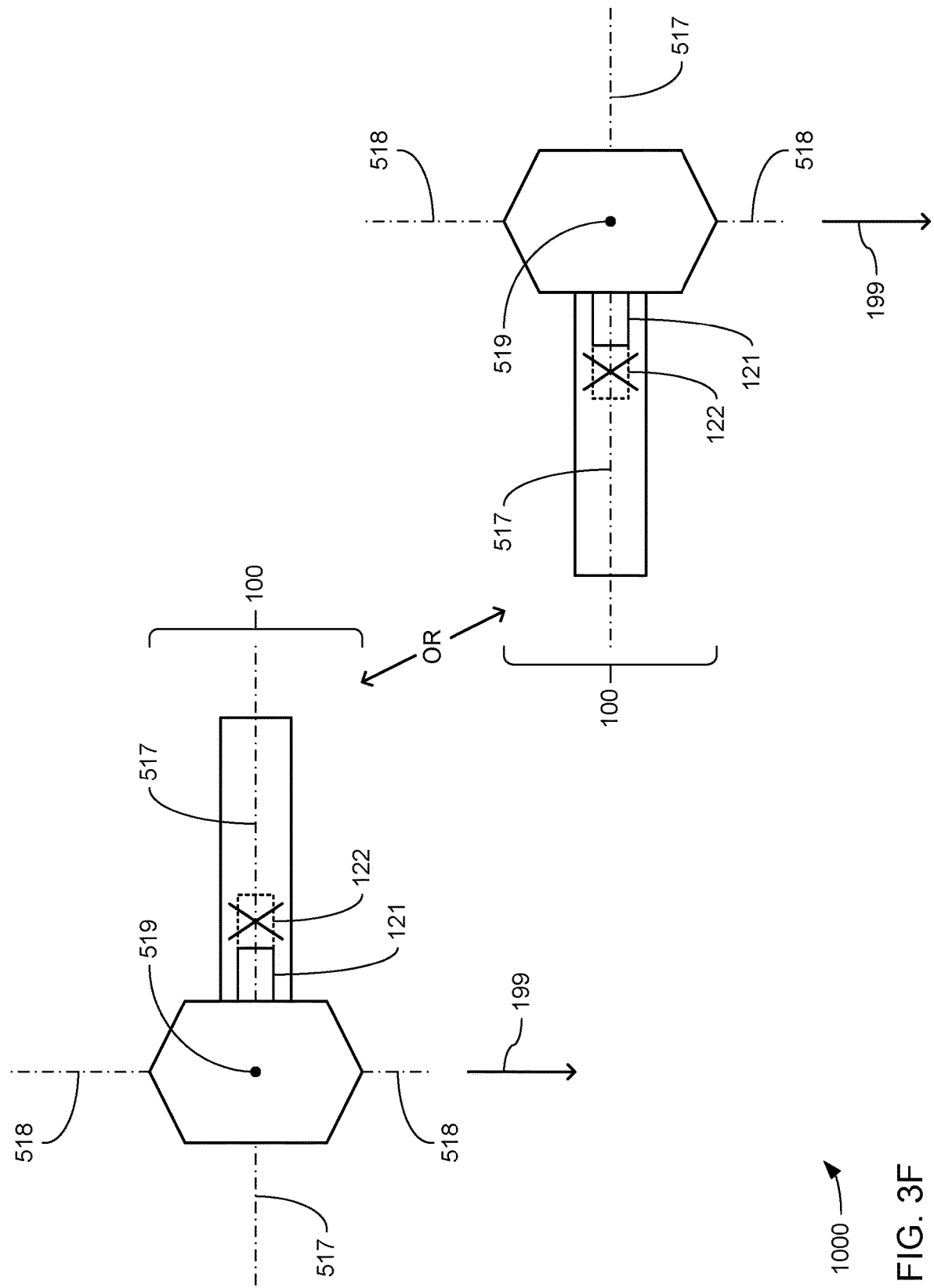
Figure 3G:
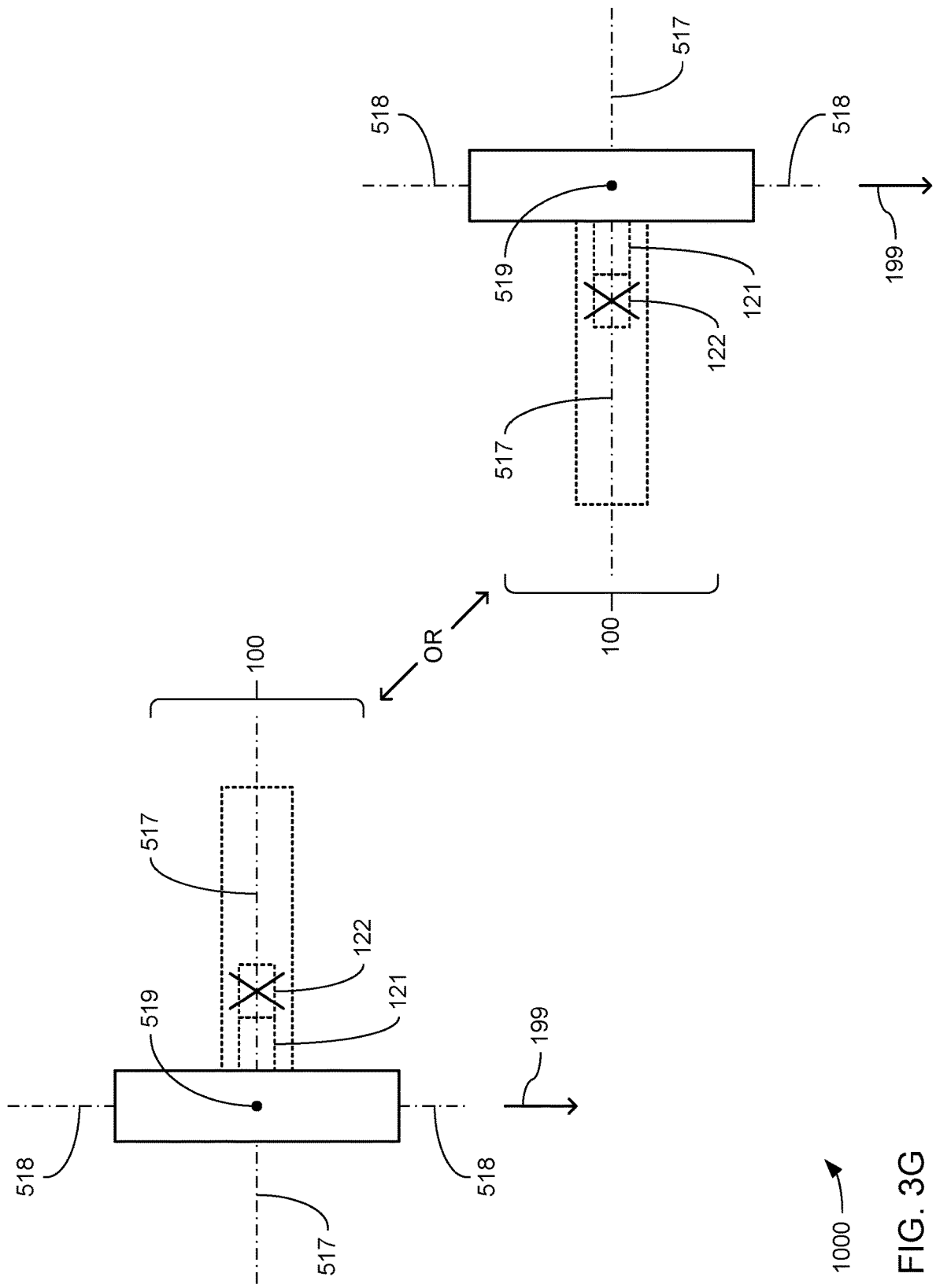

Also alternatively or additionally, referring to FIGS. 3D through 3G, and again as previously discussed, upon transitioning from the low power mode to the high power mode, the processor 550 may be caused to operate the one or more orientation sensors 510 to determine the orientation of one or more of the axes 517, 518 and/or 519 relative to the vertical direction of the force of gravity of the Earth. Past experience and experimentation have shown that there is a general tendency to hold pistol-shaped objects in an orientation similar to what is widely regarded as the "normal" and "upright" orientation in which to hold a pistol, which is with the grip thereof in a generally vertical orientation such that the equivalent of the upward-downward axis 517 of the portable device 100 would be oriented to be at or close to vertical, and such that its equivalent of the side-to-side axis 518 of the portable device 100 would be oriented to be at or close to horizontal (as depicted in FIGS. 3D-E). In contrast to this general tendency, there have been cinematic portrayals of an alternate "sideways" orientation of holding a pistol, which is with the grip thereof in a generally horizontal orientation such that the equivalent of the upward-downward axis 517 of the portable device 100 would be oriented to be at or close to horizontal, and such that its equivalent of the side-to-side axis 518 of the portable device 100 would be oriented to be at or close to vertical (as depicted in FIGS. 3F-G). Thus, these two different orientations just discussed may differ simply by a quarter-turn rotation about the forward-rearward axis 519.

In some embodiments, the processor 550 may be caused to use the orientation of the axes 517 and/or 518 detected by the one or more orientation detectors 510 as a factor in automatically determining whether to attempt a scan and decode of an indicia 775 that may be present on a portion of a surface located along the forward-rearward axis 519, or to measure a temperature of a portion of a surface located along the axis 519. More specifically, where the upward-downward axis 517 is detected to be within a predetermined range of degrees of being vertical, and/or where the side-to-side axis 518 is detected to be within a predetermined range of degrees of being horizontal, the processor 550 may determine that an indicia 775 is to be scanned and decoded. However, where the upward-downward axis 517 is detected to be within a predetermined range of degrees of being horizontal, and/or where the side-to-side axis 518 is detected to be within a predetermined range of degrees of being vertical, the processor 550 may determine that a contactless temperature measurement is to be performed.

However, as discussed above in connection with making such determinations based on a detected distance along the forward-rearward axis 519, such use of the orientation of the axes 517, 518 and/or 519 as a factor in determinations by the processor 550 of which of these two functions is to be automatically selected for being performed may be overridden by one or more other factors. By way of example, where the detected distance between the portable device 100 and a surface at a location along the forward-rearward axis 519 is less than the earlier discussed shorter distance threshold, a determination that a contactless temperature measurement is to be performed based on the orientation of each of one or more of the axes 517, 518 and/or 519 having been detected to be at (or within a predetermined range of degrees of) horizontal or vertical may be overridden with a determination that an indicia is to be scanned and decoded based on another factor. More specifically, and by way of example, where the processor 550 is also caused to monitor the primary trigger 121 and/or the secondary trigger 122 to detect an instance of one or the other being manually operated to provide an input from an operator of the portable device 100 that conveys a command to perform one or the other of these two functions, the processor 550 may employ the fact of detecting operation of one or the other of these triggers 121 or 122 as an overriding factor in determinations by the processor 550 of which of these two functions is to be automatically selected for being performed.

Alternatively or additionally, instead of serving as an overriding factor in the selection of which of these two functions is to be performed, such detection of operation of one or the other of these triggers may be employed as a condition for triggering the commencement of the performance of one or the other of these two functions. More specifically, where the detection of the orientation of one of more of the axes 517, 518 and/or 519 relative to horizontal or vertical begets a determination that a scan and decode of an indicia 775 is to be performed, the commencement of the actual performance of that function may be conditioned on the processor 550 detecting an instance of manual operation of the primary trigger 121. Alternatively or additionally, it may be that, where a determination is made that a contactless temperature measurement is to be performed, the commencement of the actual performance of that function may be similarly conditioned on the processor 550 detecting an instance of manual operation of the secondary trigger 122 (if the secondary trigger 122 is present).

Figure 3H:
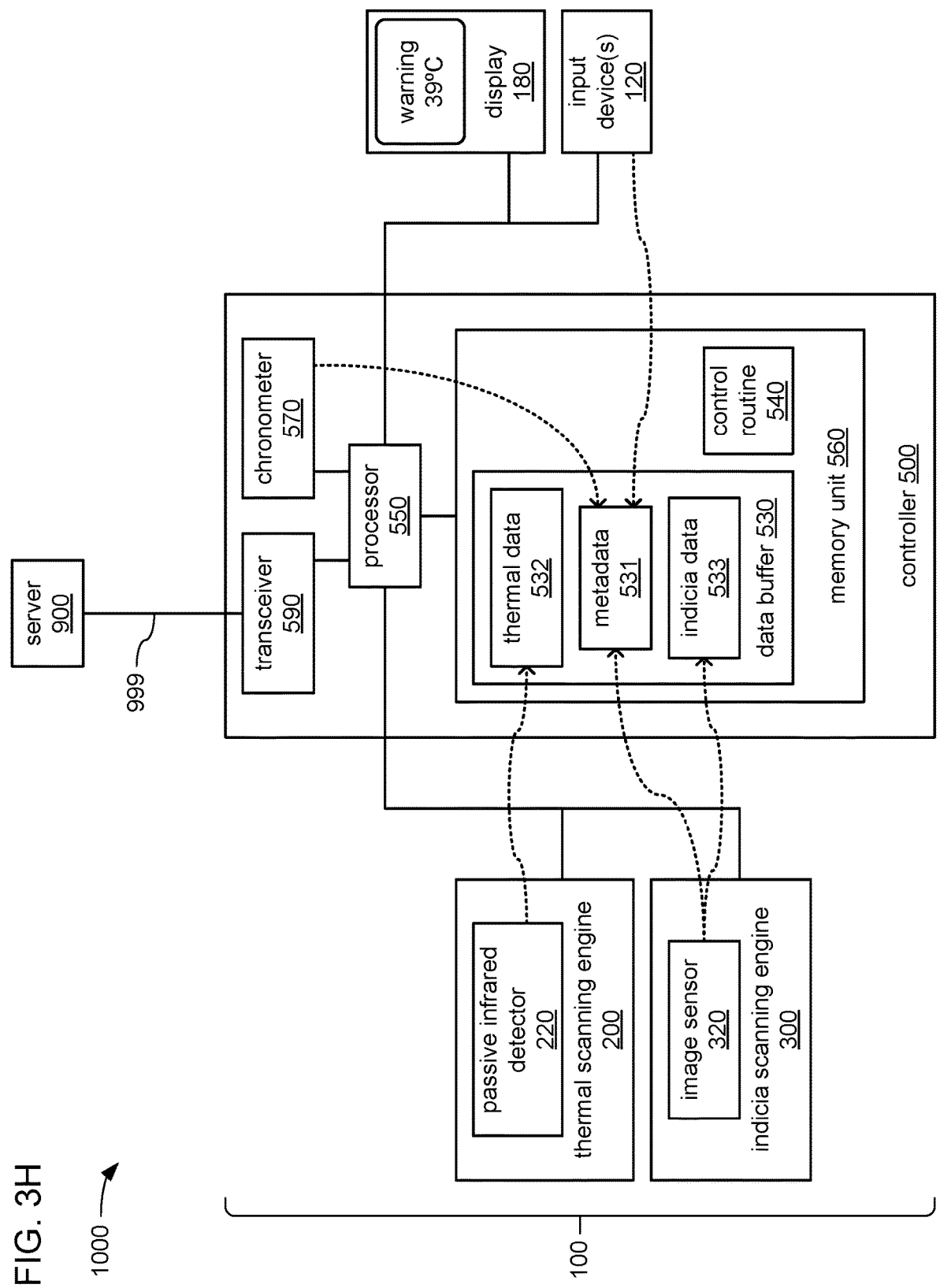

Turning to FIG. 3H, and regardless of the exact manner in which either of the two functions of the portable device 100 are selected and/or triggered to actually be performed, data obtained from the performance of either of these two operations may be temporarily stored by the processor 550 within the data buffer 530 within the memory unit 560. Once so stored, it may be that the processor 550 is caused by further execution of the control routine 540 to operate the display 180 to display such data. Thus, the display 180 may be used to visually present an indication of the temperature that was just measured through contactless temperature measurement, or at least a portion of the data that is decoded from an indicia 775 that was just scanned by capturing an image thereof. More specifically, and as depicted, temperatures that have been measured through contactless temperature measurement may be stored within the data buffer 530 as thermal data 532, and/or data that has been decoded from an indicia 775 of which an image has been captured may be stored within the data buffer 530 as the indicia data 533.

Alternatively or additionally, the processor 550 may be caused to operate the display 180 to visually present indications of the current status of portable device 100. More specifically, the processor 550 may be caused to operate the display 180 to provide a visual indication of which function the processor 550 has automatically selected to be performed, and/or to provide visual feedback to an operator of when one of these two functions is currently being performed. As will be familiar to those skilled in the art, performing a contactless measurement of temperature may take an appreciable amount of time, while performing a scan and decode of an indicia may take such a small amount of time as to be perceived as nearly instantaneous. Thus, at least in the case of a contactless temperature measurement, the provision of an indication that such an operation is being performed may serve as a mechanism to encourage the operator to hold the portable device 100 still throughout the time needed for that performance to take place.

In some embodiments, in addition to and/or in lieu of presenting a temperature that was just captured through contactless measurement and/or presenting an indication of current status of the performance of a contactless temperature measurement, the display 180 may be operated by the processor 550 to present a visual warning where a temperature high enough to indicate a health concern has been captured. Alternatively or additionally, a speaker or other audio output component (not shown) of the portable device 100 may be operated to provide an audible warning of such a high temperature. In some of such embodiments, the processor 550 may be caused by the control routine 540 to operate at least the display 180 to provide a user interface by which a threshold high temperature may be specified that may serve as the trigger for when such a visual warning is to be presented. In this way, the threshold high temperature may be adjusted to account for particular levels of elevated temperature that may be associated with different particular health conditions.

As an alternative to, or in addition to, visually presenting indications of measured temperatures and/or of decoded data from an indicia 775, the processor 550 may be caused by further execution of the control routine 540 to operate the transceiver 590 to transmit such data (e.g., the thermal data 532 and/or the indicia data 533) to another device, such as the server 900. In some embodiments, in addition to so transmitting such data, the processor 550 may be further caused to operate the transceiver 590 to additionally transmit metadata 531 concerning the time and/or place at which such data was collected, and/or concerning the person associated with such collected data.

In various embodiments, the processor 550 may obtain indications of the time, place and/or person associated with a contactless temperature measurement and/or an indicia scan from various sources. In embodiments in which the portable device 100 includes the chronometer 570, the processor 550 may access the chronometer 570 at the time one or the other of those two functions are performed to obtain an indication of the current time (e.g., both the current date and current time), and may store such an indication within the data buffer 530 as the metadata 531 for subsequent transmission with associated portions of the thermal data 532 and/or the indicia data 533. Alternatively or additionally, the processor 550 may operate the transceiver 590 to receive signals from one or more satellites (e.g., of a global positioning system), wireless networking base stations and/or access points (e.g., of an indoor wireless network), and/or land-based wireless transmission and/or relay towers (e.g., of a cellular network) to obtain and/or derive the current location of the portable device 100 and/or the current time (e.g., by triangulation). Also alternatively or additionally, the processor 550 may operate the display 180 and/or an input device 120 to provide a UI by which the processor 550 may present an operator with a request to provide an indication of the current time, the current location and/or aspects of the identity of a person.

In still other embodiments, operation of the portable device 100 to perform a contactless temperature measurement may be meant to be accompanied by a performance of scanning and decoding an indicia 775 to provide the portable device 100 with an indication of at least where the contactless temperature measurement was performed and/or an identifier of a person associated with the performance of that contactless temperature measurement. Thus, in such other embodiments, indicia 775 may provide one or both of such pieces of information.

More specifically regarding current location, as will be familiar to those skilled in the art, global positioning systems and/or systems for deriving the location of a device within an area covered by a wireless network may not be able to provide sufficient accuracy as to allow specific locations, such as the locations of particular entrances to a building and/or specific rooms within a building, to be distinguished from each other. Further, it is often the case that signals from satellites of global positioning systems are not able to penetrate through roofs, walls and/or floors of buildings such that they may not be receivable by the transceiver 590 of the portable device 100. Thus, as an alternative to relying on such systems based on wireless signals, signs or other forms of placard that provide surfaces that carry indicia that encode indications of locations may be posted at various locations within a structure (e.g., at particular doorways, entrances to particular rooms, at particular desks, etc.) or outside a structure (e.g., at particular gates, admissions booths, or other forms of entrance to an outdoor venue), and the indicia scanning function of the portable device 100 may be used to provide indications thereto of where contactless temperature measurements are performed that may be more precisely correlated to such locations. By way of example, a front desk in a lobby of a building may be provided with such a sign or placard that carries an indicia 775 that encodes data specifying the front desk location within that lobby. When a person arrives at that front desk and their temperature is taken through contactless temperature measurement using the portable device 100, the portable device 100 may also be operated to scan the indicia 775 on that sign or placard as a mechanism to quickly and efficiently provide the portable device 100 with an indication that the contactless temperature measurement just performed took place at that front desk location within that lobby. In such embodiments, it may be that the data decoded from such an indicia 775 may be stored within the data buffer 530 as part of the metadata 531 and associated with the thermal data 532 indicating what temperature was detected from the contactless temperature measurement. Further, it may be that processor 550 is caused by the control routine 540 to refrain from transmitting thermal data 532 that includes that temperature measurement until there has been such a scan performed of such an indicia 775 to provide such metadata 531.

Alternatively or additionally, more specifically regarding the identity of a person of whom a temperature measurement (e.g., of their forehead) may be taken, it may be that the person carries with them a card or other identification that includes an indicia 775 that encodes various pieces of information about that person. By way of example, it may be that the portable device 100 is used at an entrance of a building belonging to a business, a school, a government office, etc., for the purpose of checking the health of personnel by measuring their temperatures as they enter the building at a particular doorway. Each of those persons 700 may carry a badge or other form of identification on which may be carried an indicia 775 that encodes their name, their personnel identification number, their job title, etc. As each of those persons 700 enters the building, the temperature of their forehead 725 may be contactless measured using the portable device 100, and the indicia 775 on their personnel identification may be scanned. As a result, for each of those persons, the temperature of their forehead 725 may be temporarily stored as the thermal data 532, and the data concerning their identity that was decoded from their scanned indicia 775 may be stored as part of the metadata 531 that is associated with that instance of the thermal data 532. As discussed earlier, the processor 550 may be caused by the control routine 540 to refrain from transmitting either of the thermal data 532 or the metadata 531 to another device (e.g., the server 900 depicted in FIG. 1) until both have been collected and stored within the data buffer 530.

Other similar examples of such use of the portable device 100 may be at a border crossing into a country where temperatures are taken of the foreheads 725 of persons seeking entry. It may be a barcode, human-readable text and/or still some other form of indicia carried within passport that are scanned to more efficiently collect identifying information concerning those persons 700.

Figure 4A:
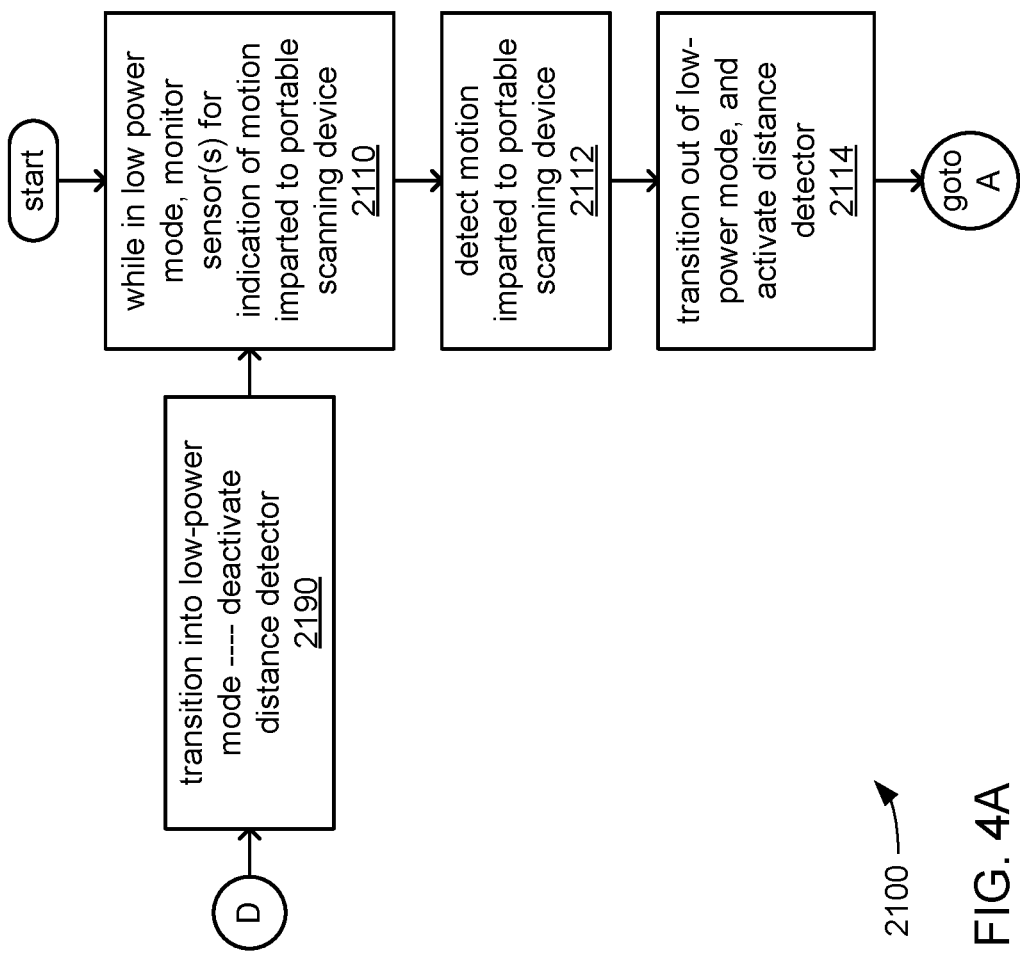
FIGS. 4A, 4B and 4C, together, show aspects of an example of automated selection between scanning indicia and measuring temperature by the portable device of the processing system of FIG. 1.
Figure 4B:
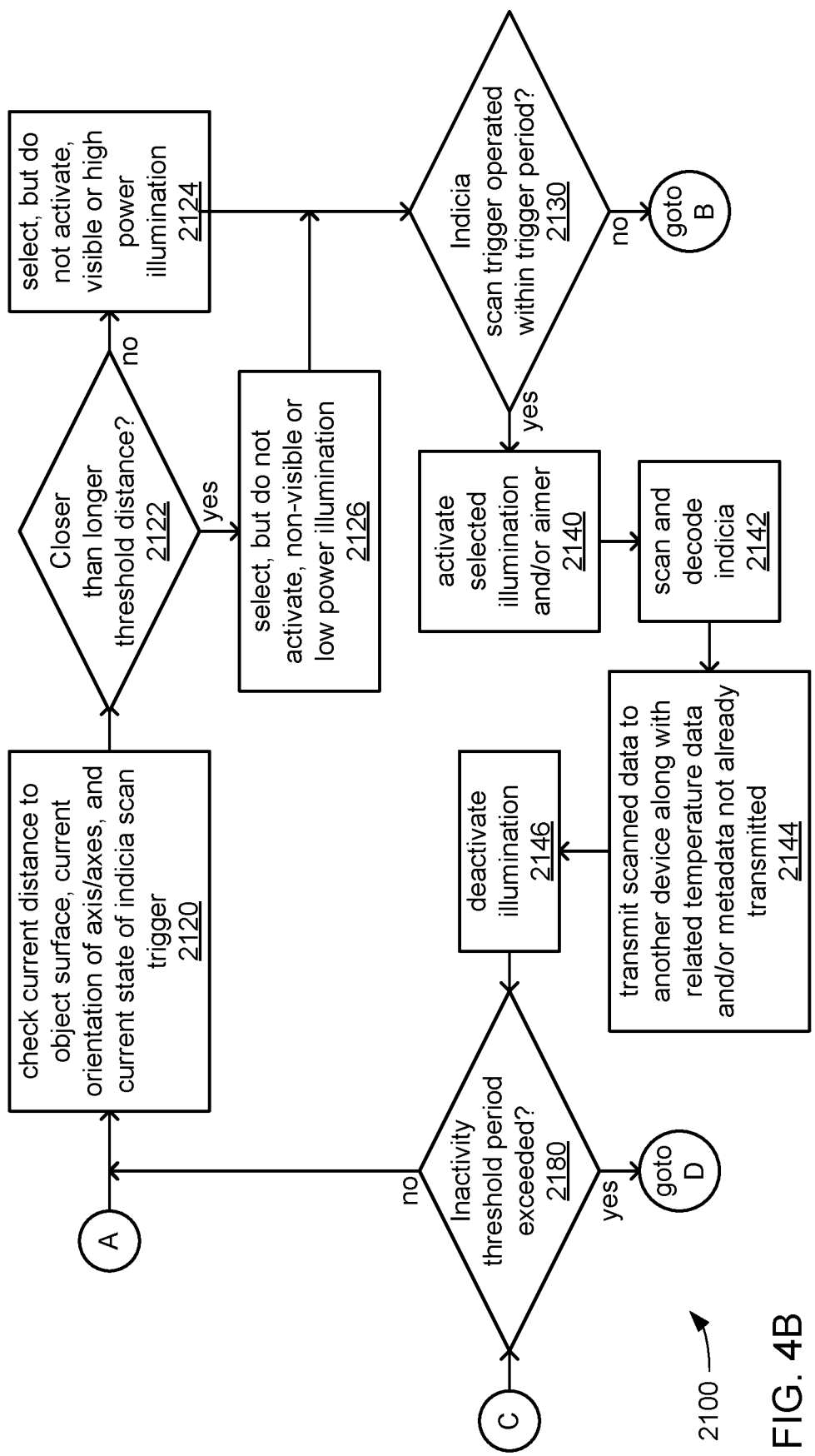
Figure 4C:
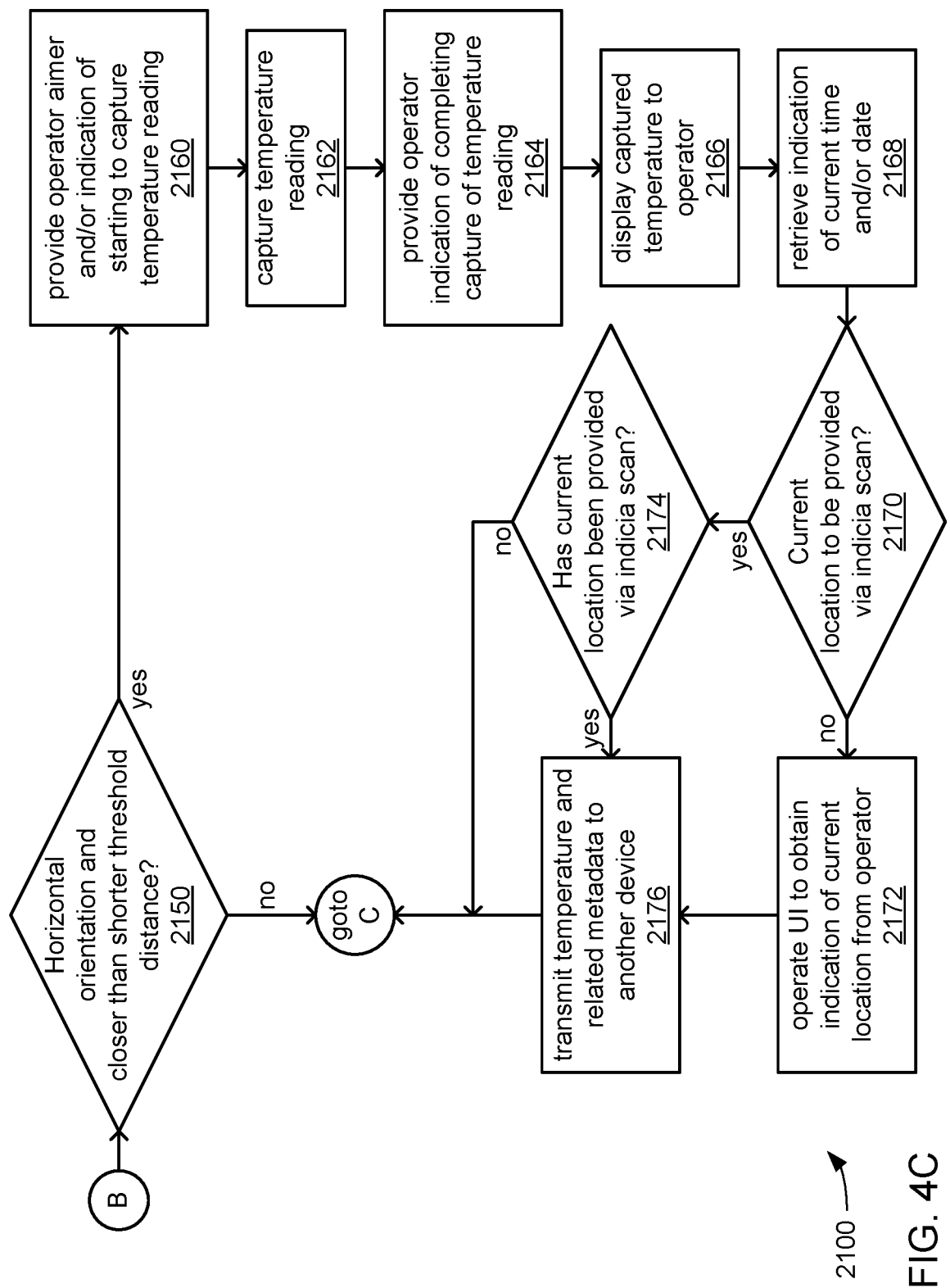

FIGS. 4A, 4B and 4C, together, provide a flowchart 2100 depicting aspects of the operation of an embodiment of the portable device 100 within the processing system 1000. More specifically, FIGS. 4A-C, together, depict aspects of operations performed by the processor 550 of the portable device 100 under the control of instructions of the control routine 540.

At 2110, while a portable device operable to perform both contactless temperature measurement and the scanning and decoding of indicia (e.g., the portable device 100) is in a low power mode, a processor thereof (e.g., the processor 550) may be caused by its execution of a control routine (e.g., the control routine 540) to monitor one or more sensors (e.g., the one or more orientation sensors 510) for indication(s) of motion being imparted to the portable device. As previously discussed, such one or more sensors may include one or more accelerometers and/or one or more gyroscopes.

At 2112, such imparted motion may be detected, and at 2114, the processor may respond to the detection of such imparted motion by transitioning the portable device out of the low power mode and into a high power mode. In so doing, the processor may activate a distance detector (e.g., the distance detector 310). As previously discussed, activation of components of the portable device may entail a processor causing electric power to be provided thereto and/or resuming performing operations that include interacting therewith.

At 2120, the processor may operate the distance detector to detect a distance between the portable device and a portion of a surface of an object that may be located along a forward-rearward axis of the portable device (e.g., the forward-rearward axis 519), may operate the one or more sensors to determine a current orientation of one or more axes (e.g., one or more of the axes 517, 518 and 519), and/or may monitor the current state of an indicia scan trigger (e.g., the primary trigger 121). As previously discussed, such use of various sensing components of the portable device may enable the processor to determine aspects of the current status of the portable device, leading to a determination of the which function of the portable device is to be performed.

At 2122, the processor may check whether the distance between the portable device and the object surface is less than a longer distance threshold (e.g., 30 cm). If not at 2122, then at 2124, the processor may select, but not yet activate, a visible and/or high power form of illumination to be generated by a light source associated with an indicia scanning engine (e.g., the scanning light source 380 of the indicia scanning engine 300) for use in illuminating a portion of the object surface. However, if so at 2122, then at 2126, the processor may select, but not yet active, a non-visible and/or low power form of illumination to be generated by the light source for use in illuminating the object surface. As previously discussed, it may be at least deemed desirable (if not deemed necessary) to be able to provide at least two different levels and/or types of light for use in scanning indicia at distances that are either shorter than or longer than such a longer threshold distance.

Regardless of which level and/or type of light is selected at either 2124 or 2126, at 2130, the processor may check whether the indicia scan trigger (e.g., the primary trigger 121) has been operated within a predetermined period of time for awaiting operation of the indicia scan trigger. If so at 2130, then at 2140, the processor may operate the light source to provide whichever level and/or type of light that was selected at either 2124 or 2126. In so doing, an additional form of light (perhaps also provided by the same light source) may also be activated to project an aiming guide onto the object surface (e.g., a pair of crosshairs, etc.) to assist the operator in maintaining whatever indicia may be present within the field of view (FOV) of the indicia scanning engine. At 2142, the processor may operate the indicia scanning engine (e.g., operate the image sensor 320 of the image scanning engine 300) to attempt to scan an image of an indicia carried on the illuminated portion of the object surface (e.g., an indicia 775 carried on a surface 771 of an object 750) by capturing an image of that illuminated portion. The processor may then also attempt to decode the indicia to retrieve the data encoded therein at 2142. At 2144 (and presuming the image capture and decoding of the indicia was successful), the processor may then operate a transceiver of the portable device (e.g., the transceiver 590) to transmit the data decoded from the indicia, along with any related temperature data indicative of a temperature measured in a contactless manner using the portable device, and/or any metadata associated with the decoded data and/or such temperature data, to another device (e.g., the sever 900). At 2146, the processor may operate the light source to deactivate its illumination of the portion of the object surface. At 2180, the processor may check whether a predefined inactivity period has elapsed since any movement was last imparted to the portable device or since the last instance of a trigger or other manually operable control of the portable device was last operated. If not at 2180, then the processor may return to operating various sensor components of the portable device at 2120. However, if so at 2180, then at 2190, the processor may transition the portable device back to the low power mode in which illumination of any operations to detect any surface along the forward-rearward axis ceases.

However, if at 2130, the indicia scan trigger has not been operated, then at 2150, the processor may check the current orientation of one of or more particular one(s) of the axes of the portable device to determine whether it is horizontal (or at least within a predetermined range of degrees of horizontal), and to determine whether the distance to the object surface along the axis is less than a shorter threshold distance (e.g., 10 cm). As has been discussed, in connection with various ones of FIGS. 3A through 3G, determinations of which function is to be performed may be based on the orientation of one or more of the axes 517, 518 and/or 519 relative to the vertical and downward direction of the pull of gravity of the Earth. More specifically, and as previously discussed in an example presented in connection with FIG. 3B, if the forward-rearward axis 519 is at or near horizontal (within a predetermined range of degrees, thereof), then the contactless temperature measurement function may be performed. Alternatively, and as previously discussed in an example presented in connection with FIGS. 3F-G, if the upward-downward axis 517 is at or near horizontal, then the contactless temperature measurement function may be performed. Thus, in different embodiments, different one(s) of the axes 517, 518 and/or 519 may be checked to determine whether they are oriented at or near horizontal.

If the particular one or more axes checked at 2150 are not at or near horizontal, then the processor may return to checking whether a predefined inactivity period has elapsed at 2180. However, the particular one or more axes checked at 2150 are at or near horizontal, then at 2160, the processor may operate a display of the portable device (e.g., the display 180) to provide a visual indication of a contactless temperature measurement of the object surface along the axis taking place. Alternatively or additionally at 2160, the processor may operate the light source to cause the projection of an aiming guide. At 2162, the processor may operate a temperature sensor of a thermal scanning engine (e.g., the passive infrared detector 220 of the thermal scanning engine 200) to perform the contactless temperature measurement. At 2164, the processor may operate the display to provide a visual indication of completion of the contactless temperature measurement.

At 2166, the processor may operate the display to visually present the temperature just measured. At 2168, the processor may retrieve from a chronometer of the portable device (e.g., the chronometer 570), or from any of a variety of sources as discussed in reference to FIG. 3D, an indication of the current time (e.g., the time and the date).

At 2170, if an indication of the current location of the portable device is to be obtained via scanning of an indicia that is indicative of the current location, then at 2172, the processor may operate at least the display to provide a user interface (UI) by which the operator of the portable device may be prompted to provide an indication of the current location of the portable device. At 2176, the processor may operate the transceiver of the portable device to transmit indications of the temperature just measured, along with any related metadata concerning time and place of the contactless temperature measurement to the other device. The processor may then return to checking whether a predefined inactivity period has elapsed at 2180.

However, if at 2170, if no indication of the current location of the portable device is to be obtained via such scanning, then the processor may check at 2174 whether such a scan to provide such location metadata has already been performed. If so at 2174, then the processor may operate the transceiver to perform the transmission at 2176. If not at 2174, then the processor may then return to checking whether a predefined inactivity period has elapsed at 2180 without performing such a transmission.

Figure 5A:
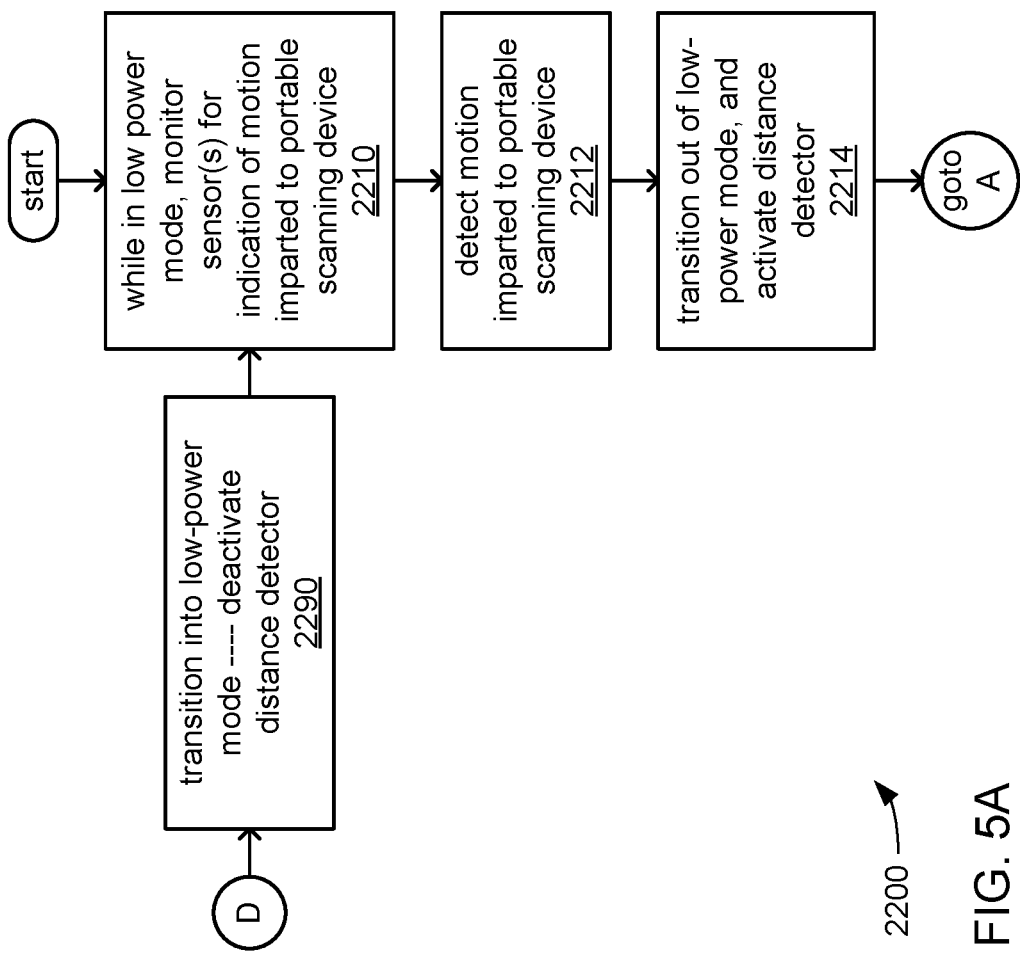
FIGS. 5A, 5B and 5C, together, show aspects of an alternate example of automated selection between scanning indicia and measuring temperature by the portable device of the processing system of FIG. 1.
Figure 5B:
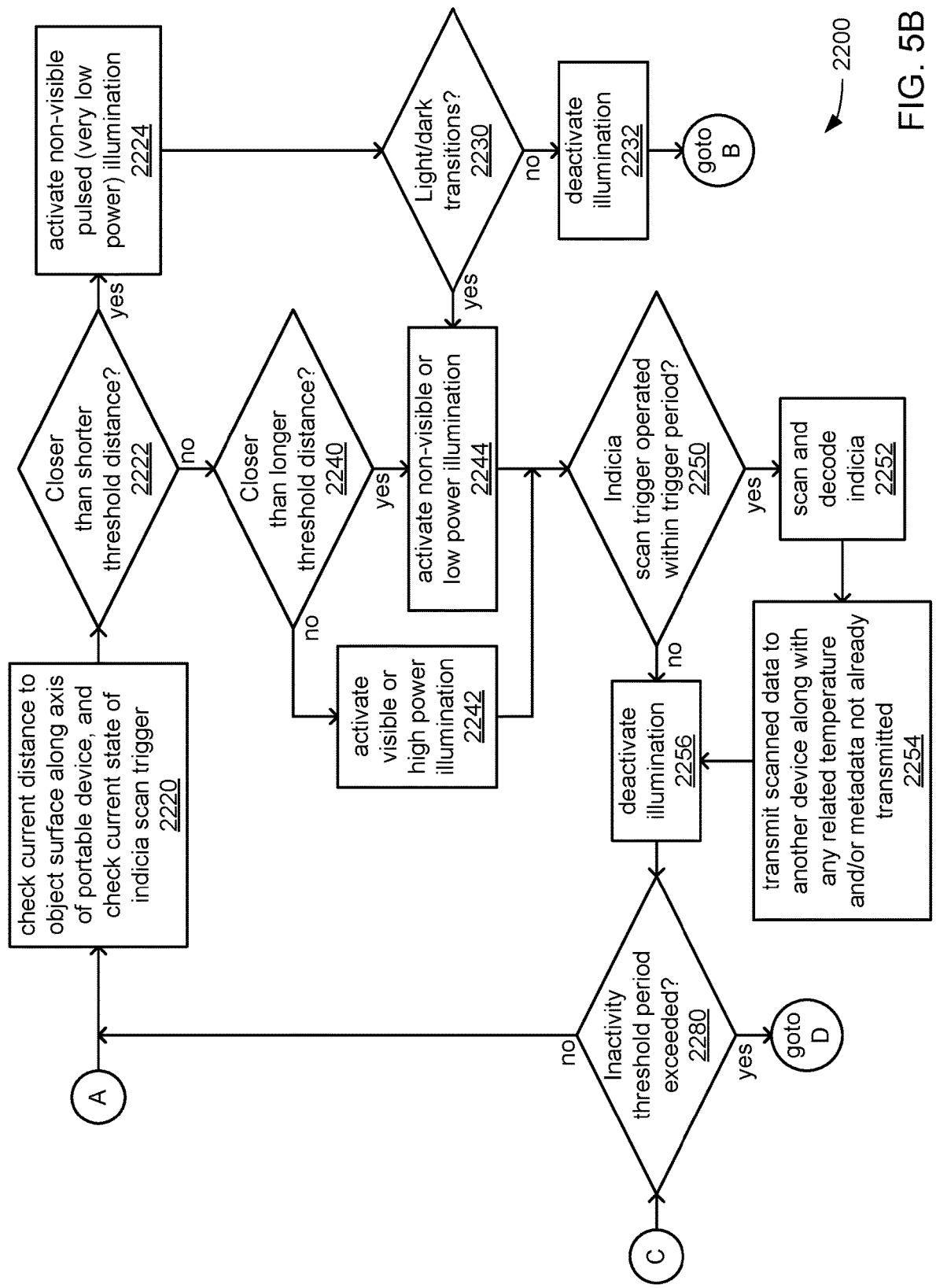
Figure 5C:
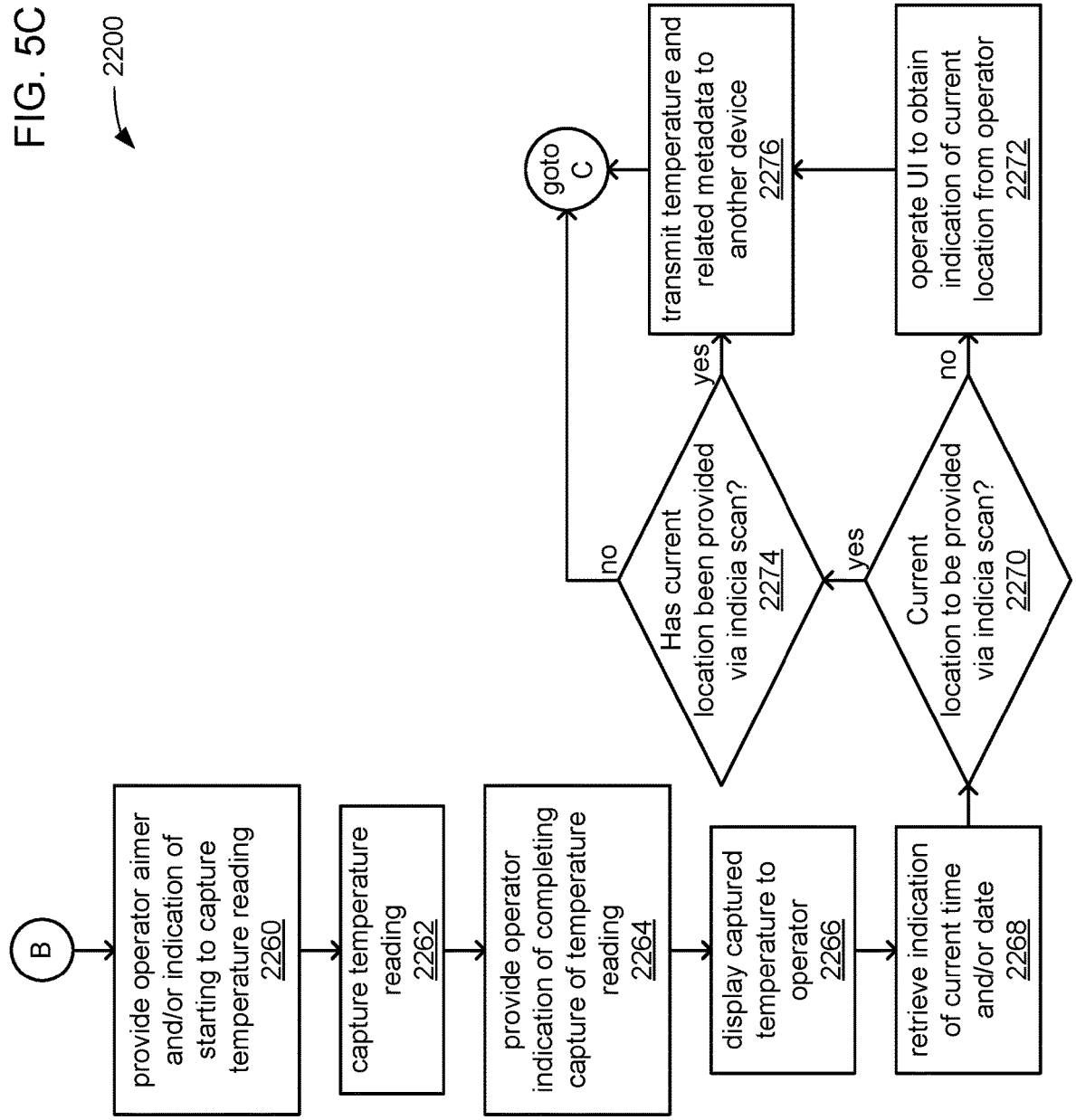

FIGS. 5A, 5B and 5C, together, provide a flowchart 2200 depicting aspects of the operation of another embodiment of the portable device 100 within the processing system 1000. More specifically, FIGS. 5A-C, together, depict aspects of operations performed by the processor 550 of the portable device 100 under the control of instructions of the control routine 540.

At 2210, while a portable device operable to perform both contactless temperature measurement and the scanning and decoding of indicia (e.g., the portable device 100) is in a low power mode, a processor thereof (e.g., the processor 550) may be caused by its execution of a control routine (e.g., the control routine 540) to monitor one or more sensors (e.g., the one or more orientation sensors 510) for indication(s) of motion being imparted to the portable device. Again, such one or more sensors may include one or more accelerometers and/or one or more gyroscopes.

At 2212, such imparted motion may be detected, and at 2214, the processor may respond to the detection of such imparted motion by transitioning the portable device out of the low power mode and into a high power mode. In so doing, the processor may activate a distance detector (e.g., the distance detector 310). Again, activation of components of the portable device may entail a processor causing electric power to be provided thereto and/or resuming performing operations that include interacting therewith.

At 2220, the processor may operate the distance detector to detect a distance between the portable device and a portion of a surface of an object that may be located along an axis of the portable device (e.g., the forward-rearward axis 519), and/or may monitor the current state of an indicia scan trigger (e.g., the primary trigger 121). Again, such use of various sensing components of the portable device may enable the processor to determine aspects of the current status of the portable device, leading to a determination of the which function of the portable device is to be performed.

At 2222, the processor may check whether the distance between the portable device and the object surface is less than a shorter distance threshold (e.g., 10 cm). If not at 2222, then at 2240, the processor may check whether the distance between the portable device and the object surface is less than a longer distance threshold (e.g., 30 cm). If not at 2240, then at 2242, the processor may operate a light source associated with an indicia scanning engine (e.g., the scanning light source 380 of the indicia scanning engine 300) to provide visible and/or high power illumination on a portion of the surface located along the axis. However, if so at 2240, then at 2244, the processor may operate that light source to provide non-visible and/or low power illumination to that portion of the surface located along the axis. Again, it may be at least deemed desirable (if not deemed necessary) to be able to provide at least two different levels and/or types of light for use in scanning indicia at distances that are either shorter than or longer than such a longer threshold distance.

Regardless of which level and/or type of light is so provided at either 2242 or 2244, at 2250, the processor may check whether the indicia scan trigger has been operated within a predetermined period of time that operation of the indicia scan trigger is to be awaited. If so at 2250, then at 2252, the processor may operate the indicia scanning engine (e.g., operate the image sensor 320 of the image scanning engine 300) to attempt to scan an image of an indicia carried on the illuminated portion of the object surface along the axis (e.g., an indicia 775 carried on a surface 771 of an object 750) by capturing an image of that illuminated portion. In so doing, the processor may cause a visible aiming guide to be projected in response to operation of the indicia scan trigger as the scanning is performed. The processor may then also attempt to decode the indicia to retrieve the data encoded therein at 2252. At 2254 (and presuming the image capture and decoding of the indicia was successful), the processor may then operate a transceiver of the portable device (e.g., the transceiver 590) to transmit the data decoded from the indicia, along with any related temperature data indicative of a temperature measured in a contactless manner using the portable device, and/or any metadata associated with the decoded data and/or such temperature data, to another device (e.g., the sever 900). At 2256, the processor may operate the light source to deactivate its illumination of the portion of the object surface located along the axis. However, if at 2250, the indicia scan trigger has not been operated, then the processor may operate the light source to deactivate its illumination of the portion of the object surface located along the axis at 2256 without having attempted to scan or decode an indicia.

Regardless of whether a scan and decode are attempted before illumination is deactivated at 2256, at 2280, the processor may check whether a predefined inactivity period has elapsed since any movement last imparted to the portable device or since the last instance of a trigger or other manually operable control of the portable device was last operated. If not at 2280, then the processor may return to operating various sensor components of the portable device at 2220. However, if so at 2280, then at 2290, the processor may transition the portable device back to the low power mode in which any operations to detect any surface along the axis cease.

However, at 2222, if the distance along the axis (e.g., the forward-rearward axis 519) between the portable device and the object surface is less than the shorter threshold distance (e.g., 10 cm), then at 2224, the processor may operate the light source to provide a non-visible and still lower power (e.g., pulsed) illumination to the portion of the object surface located along the axis. As previously discussed, the fact of detecting a surface that is closer than the shorter threshold distance may be taken as an indication that the surface is of a person's forehead (e.g., the forehead 725 of a person 700) such that it may be deemed desirable to provide non-visible and lower intensity light to further avoid the possibility of inflicting injury to a person's eyes.

At 2230, the processor may use the image sensor of the scanning engine to capture an image of the detected object surface along the axis, and may then analyze the captured image to determine whether a set of transitions between light and dark that is characteristic of an indicia is present in that captured image. If so at 2230, then the processor may operate the light source to provide the non-visible or low power illumination at 2244 (which is more illumination than may be provided at 2224). If not at 2230, then at 2232, the processor may operate the light source to deactivate its illumination of the portion of the object surface altogether.

At 2260, the processor may operate a display of the portable device (e.g., the display 180) to provide a visual indication of a contactless temperature measurement of the object surface along the axis taking place. Alternatively or additionally at 2260, the processor may operate the light source to cause the projection of an aiming guide. At 2262, the processor may operate a temperature sensor of a thermal scanning engine (e.g., the passive infrared detector 220 of the thermal scanning engine 200) to perform the contactless temperature measurement. At 2264, the processor may operate the display to provide a visual indication of completion of the contactless temperature measurement.

At 2266, the processor may operate the display to visually present the temperature just measured. At 2268, the processor may retrieve from a chronometer of the portable device (e.g., the chronometer 570), or from any of a variety of sources as discussed in reference to FIG. 3D, an indication of the current time (e.g., the time and the date).

At 2270, if an indication of the current location of the portable device is to be obtained via scanning of an indicia that is indicative of the current location, then at 2272, the processor may operate at least the display to provide a user interface (UI) by which the operator of the portable device may be prompted to provide an indication of the current location of the portable device. At 2276, the processor may operate the transceiver of the portable device to transmit indications of the temperature just measured, along with any related metadata concerning time and place of the contactless temperature measurement to the other device. The processor may then return to checking whether a predefined inactivity period has elapsed at 2280.

However, if at 2270, if no indication of the current location of the portable device is to be obtained via such scanning, then the processor may check at 2274 whether such a scan to provide such location metadata has already been performed. If so at 2274, then the processor may operate the transceiver to perform the transmission at 2276. If not at 2274, then the processor may then return to checking whether a predefined inactivity period has elapsed at 2280 without performing such a transmission.

There is thus disclosed a portable device operable to perform the dual functions of contactless temperature measurement and the scanning and decoding of indicia with automated selection between these two functions based on one or more detected conditions. The features set forth below may be combined in any of a variety of ways to create any of a variety of embodiments of such a device and/or of a processing system that incorporates such a device to generate a data set of data collected by such a device.

A scanning device includes: a motion sensor configured to detect motion imparted to the scanning device; a distance detector configured to determine a distance between the scanning device and a surface; an infrared detector configured to capture a temperature of the surface; an image sensor configured to capture an image of an indicia that encodes data on the surface; and a processor coupled to at least a storage configured to store the captured image and the captured temperature. The processor is configured to: operate the motion sensor to detect motion being imparted to the scanning device when the scanning device is in a low power state; and in response to the detection of motion being imparted to the scanning device, the processor is further configured to transition the scanning device out of the low power state by performance of operations including operate the distance detector to determine the distance between the scanning device and the surface, and determine, based at least on the distance between the scanning device and the surface, whether to operate the infrared detector to capture the temperature of the surface, and whether to operate the image sensor to capture the image of the indicia.

The scanning device may include an orientation sensor configured to detect an orientation of an axis of the scanning device, wherein the axis comprises a forward-rearward axis extending along a lengthwise dimension of the scanning device and to the surface, and another axis extending through the scanning device and across the forward-rearward axis at a right angle. The processor may be configured to, in response to the detection of motion being imparted to the scanning device when the scanning device is in the low power state. In response to a determination that the distance between the scanning device and the surface is less than a first threshold distance, the processor may also be configured to operate the orientation sensor to determine the orientation of the axis of the scanning device, and in response to a determination that the orientation of the axis is within a preselected threshold degree of horizontal: provide an operator of the scanning device with an indication of commencement of the capture of the temperature of the surface; operate the infrared detector to capture the temperature of the surface; provide the operator with an indication of completion of the capture of the temperature of the surface; retrieve a current time or date that is indicative of when the temperature of the surface was captured; retrieve a current location of the scanning device that is indicative of where the temperature of the surface was captured; and operate a transceiver of the scanning device to transmit indications of the captured temperature, the current time or date, and the current location of the scanning device to another device.

The scanning device may include an orientation sensor configured to detect an orientation of an axis of the scanning device, wherein the axis comprises a forward-rearward axis extending along a lengthwise dimension of the scanning device and to the surface, and another axis extending through the scanning device and across the forward-rearward axis at a right angle; and a light source configured to illuminate the surface. The scanning device may also include an indicia scan trigger configured to be manually operated to trigger operation of the image sensor to capture the image of the indicia, wherein a first field of view (FOV) of the infrared detector and a second FOV of the image sensor extend outwardly from the scanning device in parallel with the axis of the scanning device. The processor may be configured to, in response to the detection of motion being imparted to the scanning device when the scanning device is in the low power state, perform operations including: monitor the indicia scan trigger to detect the manual operation thereof; in response to detection of the manual operation of the indicia scan trigger, and to a determination that the distance between the scanning device and the surface is less than a second threshold distance, operate the light source to output a low level of light to illuminate the surface, and operate the image sensor to capture the image of the indicia using the low level of light; in response to detection of the manual operation of the indicia scan trigger, and to a determination that the distance between the scanning device and the surface is greater than the second threshold distance, operate the light source to output a high level of light that is higher than the low level of light to illuminate the surface, and operate the image sensor to capture the image of the indicia using the high level of light; decode the indicia to retrieve the data encoded therein; and operate a transceiver of the scanning device to transmit the decoded data to another device.

The scanning device may include a light source configured to illuminate the surface. The processor may be configured to, in response to the detection of motion being imparted to the scanning device when the scanning device is in the low power state, and in response to a determination that the distance between the scanning device and the surface is less than a first threshold distance: operate the light source to illuminate the surface; and operate the image sensor to determine whether a set of transitions between light and dark indicative of the indicia is present on the surface. The processor may also be configured to, in response to a determination that the set of transitions is not present on the surface: provide an operator of the scanning device with an indication of commencement of the capture of the temperature of the surface; operate the infrared detector to capture the temperature of the surface; provide the operator with an indication of completion of the capture of the temperature of the surface; retrieve a current time or date that is indicative of when the temperature of the surface was captured; retrieve a current location of the scanning device that is indicative of where the temperature of the surface was captured; and operate a transceiver of the scanning device to transmit indications of the captured temperature, the current time or date, and the current location of the scanning device to another device.

The scanning device may include: a light source configured to illuminate the surface; and an indicia scan trigger configured to be manually operated to trigger operation of the image sensor to capture the image of the indicia. The processor may be configured to, in response to a determination that the distance between the scanning device and the surface is greater than a first threshold distance: operate the light source to illuminate the surface; and monitor the indicia scan trigger to detect the manual operation thereof. The processor may also be configured to, in response to detection of the manual operation of the indicia scan trigger: operate the image sensor to capture the image of the indicia using illumination from the light source; decode the indicia to retrieve the data encoded therein; and operate a transceiver of the scanning device to transmit the decoded data to another device.

The scanning device may include: a chronometer to maintain a current time or date; and a transceiver configured to communicate with another device. The processor may be configured to: retrieve the current time or date from the chronometer, wherein the current time or date is indicative of when the temperature of the surface or the image of the indicia was captured; and operate the transceiver to transmit, to the other device, the current time or date, a current location of the scanning device, and at least one of the captured temperature and the data encoded within the indicia to enable a log of captured temperatures or encoded data to be generated by the other device.

The processor may be configured to operate the transceiver to receive signals indicative of the current location of the scanning device from one of a plurality of satellites and a plurality of stationary wireless access devices, wherein the current location of the scanning device is indicative of where the temperature of the surface or the image of the indicia was captured.

The data encoded within the indicia may include an indication of at least one of: the current location of the scanning device; and an aspect of an identity of a person, wherein the captured temperature is a temperature of a body part of the person. The processor is configured to decode the indicia from within the captured image to determine the current location of the scanning device.

The scanning device may include a display, wherein the processor may be configured to operate the display to provide an operator of the scanning device with an indication of the captured temperature and a request to provide at least one of: an indication of the current location of the scanning device; and an indication of an aspect of an identity of a person, wherein the captured temperature comprises a temperature of a body part of the person. The scanning device may include an input device, wherein the processor is configured to monitor the input device to receive the requested indication of the current location of the scanning device.

The processor may be configured to operate the transceiver to delay the transmission of the current time or date, and the one of the captured temperature and the data encoded within the indicia until an indication of the current location of the scanning device is received through the transceiver or an input device that enables manual input from an operator of the scanning device.

A method includes operating a motion sensor of a scanning device to detect motion being imparted to the scanning device when the scanning device is in a low power state. The method also includes, in response to the detection of motion being imparted to the device, transitioning the device out of the low power state by performing operations including:

operating a distance detector of the scanning device to determine the distance between the scanning device and a surface; and determining, by a processor of the scanning device, and based at least on the distance between the scanning device and the surface, whether to operate an infrared detector of the scanning device to capture a temperature of the surface, and whether to operate an image sensor of the scanning device to capture an image of an indicia that encodes data on the surface.

The method may also include, in response to the detection of motion being imparted to the scanning device when the scanning device is in the low power state, and in response to a determination that the distance between the scanning device and the surface is less than a first threshold distance, performing operations including, operate an orientation sensor of the scanning device to determine the orientation of an axis of the scanning device, wherein the axis includes a forward-rearward axis extending along a lengthwise dimension of the scanning device and to the surface, and another axis extending through the scanning device and across the forward-rearward axis at a right angle. The method also includes, in response to a determination that the orientation of the axis is within a preselected threshold degree of horizontal, performing operations including: providing an operator of the scanning device with an indication of commencement of the capture of the temperature of the surface; operating the infrared detector to capture the temperature of the surface; providing the operator with an indication of completion of the capture of the temperature of the surface; retrieving a current time or date that is indicative of when the temperature of the surface was captured; retrieving a current location of the scanning device that is indicative of where the temperature of the surface was captured; and operating a transceiver of the scanning device to transmit indications of the captured temperature, the current time or date, and the current location of the scanning device to another device.

A first field of view (FOV) of the infrared detector and a second FOV of the image sensor extend outwardly from the scanning device in parallel with an axis of the scanning device; and the axis may include a forward-rearward axis extending along a lengthwise dimension of the scanning device and to the surface, and another axis extending through the scanning device and across the forward-rearward axis at a right angle. The method may include, in response to the detection of motion being imparted to the scanning device when the scanning device is in the low power state, performing operations including: monitoring an indicia scan trigger of the scanning device to detect manual operation thereof; in response to detection of the manual operation of the indicia scan trigger, and to a determination that the distance between the scanning device and the surface is less than a second threshold distance, operating a light source of the scanning device to output a low level of light to illuminate the surface, and operating the image sensor to capture the image of the indicia using the low level of light; in response to detection of the manual operation of the indicia scan trigger, and to a determination that the distance between the scanning device and the surface is greater than the second threshold distance, operating the light source to output a high level of light that is higher than the low level of light to illuminate the surface, and operating the image sensor to capture the image of the indicia using the high level of light; decoding, by the processor, the indicia to retrieve the data encoded therein; and operating a transceiver of the scanning device to transmit the decoded data to another device.

The method may include, in response to the detection of motion being imparted to the scanning device when the scanning device is in the low power state, and in response to a determination that the distance between the scanning device and the surface is less than a first threshold distance: operating a light source of the scanning device to illuminate the surface; and operating the image sensor to determine whether a set of transitions between light and dark indicative of the indicia is present on the surface. The method may also include, in response to a determination that the set of transitions is not present on the surface: providing an operator of the scanning device with an indication of commencement of the capture of the temperature of the surface; operating the infrared detector to capture the temperature of the surface; providing the operator with an indication of completion of the capture of the temperature of the surface; retrieving a current time or date that is indicative of when the temperature of the surface was captured; retrieving a current location of the scanning device that is indicative of where the temperature of the surface was captured; and operating a transceiver of the scanning device to transmit indications of the captured temperature, the current time or date, and the current location of the scanning device to another device.

The method may include, in response to a determination that the distance between the scanning device and the surface is greater than a first threshold distance: operating the light source of the scanning device to illuminate the surface; and monitoring an indicia scan trigger of the scanning device to detect manual operation thereof. The method may also include, in response to detection of the manual operation of the indicia scan trigger, performing operations including: operating the image sensor to capture the image of the indicia using illumination from the light source; decoding, by the processor, the indicia to retrieve the data encoded therein; and operating a transceiver of the scanning device to transmit the decoded data to another device.

The method may include: retrieving the current time or date from a chronometer of the scanning device, wherein the current time or date is indicative of when the temperature of the surface or the image of the indicia was captured; and operating a transceiver of the scanning device to transmit, to the other device, the current time or date, a current location of the scanning device, and at least one of the captured temperature and the data encoded within the indicia to enable a log of captured temperatures or encoded data to be generated by the other device.

The method may include, operating the transceiver to receive signals indicative of the current location of the scanning device from one of a plurality of satellites and a plurality of stationary wireless access devices, wherein the current location of the scanning device is indicative of where the temperature of the surface or the image of the indicia was captured.

The data encoded within the indicia may include an indication of at least one of: the current location of the scanning device, and an aspect of an identity of a person, wherein the captured temperature is a temperature of a body part of the person. The method may include decoding, by the processor, the indicia from within the captured image to determine the current location of the scanning device.

The scanning device may include a display and an input device. The method may include operating the display to provide an operator of the scanning device with an indication of the captured temperature and a request to provide at least one of: an indication of the current location of the scanning device; and an indication of an aspect of an identity of a person, wherein the captured temperature comprises a temperature of a body part of the person. The method may also include monitoring the input device to receive the requested indication of the current location of the scanning device.

The method may also include operating the transceiver to delay the transmission of the current time or date, and the one of the captured temperature and the data encoded within the indicia until an indication of the current location of the scanning device is received through the transceiver or an input device that enables manual input from an operator of the scanning device.

The invention claimed is:

1. A scanning device comprising:
    a motion sensor configured to detect motion imparted to the scanning device;
    a distance detector configured to determine a distance between the scanning device and a surface;
    an infrared detector configured to capture a temperature of the surface;
    an image sensor configured to capture an image of an indicia that encodes data on the surface;
    a light source configured to illuminate the surface;
    an indicia scan trigger configured to be manually operated to trigger operation of the image sensor to capture the image of the indicia; and
    a processor coupled to at least a storage configured to store the captured image and the captured temperature, the processor configured to:
        operate the motion sensor to detect motion being imparted to the scanning device when the scanning device is in a low power state; and
        in response to the detection of motion being imparted to the scanning device, the processor is further configured to transition the scanning device out of the low power state by performance of operations comprising:
            operate the distance detector to determine the distance between the scanning device and the surface; and
            determine, based at least on the distance between the scanning device and the surface, whether to operate the infrared detector to capture the temperature of the surface, and whether to operate the image sensor to capture the image of the indicia; and
        in response to a determination that the distance between the scanning device and the surface is greater than a first threshold distance:
            operate the light source to illuminate the surface;
            monitor the indicia scan trigger to detect the manual operation thereof; and
            in response to detection of the manual operation of the indicia scan trigger:
                operate the image sensor to capture the image of the indicia using illumination from the light source;
                decode the indicia to retrieve the data encoded therein; and
                operate a transceiver of the scanning device to transmit the decoded data to another device.

2. The scanning device of claim 1, wherein the first threshold distance is set at a value of 10 cm or less.

3. The scanning device of claim 1, wherein the light source emits non-visible illumination.

4. The scanning device of claim 1, comprising an orientation sensor configured to detect an orientation of an axis of the scanning device, wherein:
    the axis comprises a forward-rearward axis extending along a lengthwise dimension of the scanning device and to the surface, and another axis extending through the scanning device and across the forward-rearward axis at a right angle; and
    the processor is configured to, in response to the detection of motion being imparted to the scanning device when the scanning device is in the low power state, and in response to a determination that the distance between the scanning device and the surface is less than the first threshold distance:
        operate the orientation sensor to determine the orientation of the axis of the scanning device; and
        in response to a determination that the orientation of the axis is within a preselected threshold degree of horizontal:
            provide an operator of the scanning device with an indication of commencement of the capture of the temperature of the surface;
            operate the infrared detector to capture the temperature of the surface;
            provide the operator with an indication of completion of the capture of the temperature of the surface;
            retrieve a current time or date that is indicative of when the temperature of the surface was captured;
            retrieve a current location of the scanning device that is indicative of where the temperature of the surface was captured; and
            operate a transceiver of the scanning device to transmit indications of the captured temperature, the current time or date, and the current location of the scanning device to another device.

5. The scanning device of claim 1, comprising:
    an orientation sensor configured to detect an orientation of an axis of the scanning device, wherein the axis comprises a forward-rearward axis extending along a lengthwise dimension of the scanning device and to the surface, and another axis extending through the scanning device and across the forward-rearward axis at a right angle;
    a light source configured to illuminate the surface; and
    an indicia scan trigger configured to be manually operated to trigger operation of the image sensor to capture the image of the indicia, wherein:
        a first field of view (FOV) of the infrared detector and a second FOV of the image sensor extend outwardly from the scanning device in parallel with the axis of the scanning device; and
        the processor is configured to:
            in response to the detection of motion being imparted to the scanning device when the scanning device is in the low power state:
                monitor the indicia scan trigger to detect the manual operation thereof;
                in response to detection of the manual operation of the indicia scan trigger, and to a determination that the distance between the scanning device and the surface is less than a second threshold distance, operate the light source to output a low level of light to illuminate the surface, and operate the image sensor to capture the image of the indicia using the low level of light;
                in response to detection of the manual operation of the indicia scan trigger, and to a determination that the distance between the scanning device and the surface is greater than the second threshold distance, operate the light source to output a high level of light that is higher than the low level of light to illuminate the surface, and operate the image sensor to capture the image of the indicia using the high level of light;

decode the indicia to retrieve the data encoded therein; and operate a transceiver of the scanning device to transmit the decoded data to another device.

6. A scanning device comprising:

a motion sensor configured to detect motion imparted to the scanning device;

a distance detector configured to determine a distance between the scanning device and a surface;

an infrared detector configured to capture a temperature of the surface;

an image sensor configured to capture an image of an indicia that encodes data on the surface;

a light source configured to illuminate the surface; and a processor coupled to at least a storage configured to store the captured image and the captured temperature, the processor configured to:

operate the motion sensor to detect motion being imparted to the scanning device when the scanning device is in a low power state;

in response to the detection of motion being imparted to the scanning device, the processor is further configured to transition the scanning device out of the low power state by performance of operations comprising:

operate the distance detector to determine the distance between the scanning device and the surface; and determine, based at least on the distance between the scanning device and the surface, whether to operate the infrared detector to capture the temperature of the surface, and whether to operate the image sensor to capture the image of the indicia; and in response to the detection of motion being imparted to the scanning device when the scanning device is in the low power state, and in response to a determination that the distance between the scanning device and the surface is less than the first threshold distance:

operate the light source to illuminate the surface;

operate the image sensor to determine whether a set of transitions between light and dark indicative of the indicia is present on the surface; and in response to a determination that the set of transitions is not present on the surface:

provide an operator of the scanning device with an indication of commencement of the capture of the temperature of the surface;

operate the infrared detector to capture the temperature of the surface;

provide the operator with an indication of completion of the capture of the temperature of the surface;

retrieve a current time or date that is indicative of when the temperature of the surface was captured;

retrieve a current location of the scanning device that is indicative of where the temperature of the surface was captured; and operate a transceiver of the scanning device to transmit indications of the captured temperature, the current time or date, and the current location of the scanning device to another device.

7. A scanning device, comprising:

a motion sensor configured to detect motion imparted to the scanning device;

a distance detector configured to determine a distance between the scanning device and a surface;

an infrared detector configured to capture a temperature of the surface;

an image sensor configured to capture an image of an indicia that encodes data on the surface; and a processor coupled to at least a storage configured to store the captured image and the captured temperature, the processor configured to:

operate the motion sensor to detect motion being imparted to the scanning device when the scanning device is in a low power state; and in response to the detection of motion being imparted to the scanning device, the processor is further configured to transition the scanning device out of the low power state by performance of operations comprising:

operate the distance detector to determine the distance between the scanning device and the surface; and determine, based at least on the distance between the scanning device and the surface, whether to operate the infrared detector to capture the temperature of the surface, and whether to operate the image sensor to capture the image of the indicia;

a chronometer to maintain a current time or date; and a transceiver configured to communicate with another device, wherein the processor is configured to:

retrieve the current time or date from the chronometer, wherein the current time or date is indicative of when the temperature of the surface or the image of the indicia was captured; and operate the transceiver to transmit, to the other device, the current time or date, a current location of the scanning device, and at least one of the captured temperature and the data encoded within the indicia to enable a log of captured temperatures or encoded data to be generated by the other device.

8. The scanning device of claim 7, wherein the processor is configured to operate the transceiver to receive signals indicative of the current location of the scanning device from one of a plurality of satellites and a plurality of stationary wireless access devices, wherein the current location of the scanning device is indicative of where the temperature of the surface or the image of the indicia was captured.

9. The scanning device of claim 7, wherein:

the data encoded within the indicia comprises an indication of at least one of:

the current location of the scanning device; and an aspect of an identity of a person, wherein the captured temperature is a temperature of a body part of the person; and the processor is configured to decode the indicia from within the captured image to determine the current location of the scanning device or an aspect of an identity of a person.

10. The scanning device of claim 7, comprising:
a display, wherein the processor is configured to operate the display to provide an operator of the scanning device with an indication of the captured temperature and a request to provide at least one of:
  an indication of the current location of the scanning device; and
  an indication of an aspect of an identity of a person, wherein the captured temperature comprises a temperature of a body part of the person; and
an input device, wherein the processor is configured to monitor the input device to receive the requested indication of the current location of the scanning device or an aspect of an identity of a person.

11. The scanning device of claim 7, wherein the processor is configured to operate the transceiver to delay the transmission of the current time or date, and the one of the captured temperature and the data encoded within the indicia until an indication of the current location of the scanning device is received through the transceiver or an input device that enables manual input from an operator of the scanning device.

12. A method comprising:
operating a motion sensor of a scanning device to detect motion being imparted to the scanning device when the scanning device is in a low power state;
in response to the detection of motion being imparted to the device, transitioning the device out of the low power state by performing operations comprising:
  operating a distance detector of the scanning device to determine the distance between the scanning device and a surface; and
  determining, by a processor of the scanning device, and based at least on the distance between the scanning device and the surface, whether to operate an infrared detector of the scanning device to capture a temperature of the surface, and whether to operate an image sensor of the scanning device to capture an image of an indicia that encodes data on the surface;
operating the light source of the scanning device to illuminate the surface;
monitoring an indicia scan trigger of the scanning device to detect manual operation thereof; and
in response to detection of the manual operation of the indicia scan trigger, performing operations comprising:
  operating the image sensor to capture the image of the indicia using illumination from the light source;
  decoding, by the processor, the indicia to retrieve the data encoded therein; and
  operating a transceiver of the scanning device to transmit the decoded data to another device.

13. The method of claim 12, comprising, in response to the detection of motion being imparted to the scanning device when the scanning device is in the low power state, and in response to a determination that the distance between the scanning device and the surface is less than a first threshold distance, performing operations comprising:
operate an orientation sensor of the scanning device to determine the orientation of an axis of the scanning device, wherein the axis comprises a forward-rearward axis extending along a lengthwise dimension of the scanning device and to the surface, and another axis extending through the scanning device and across the forward-rearward axis at a right angle; and
in response to a determination that the orientation of the axis is within a preselected threshold degree of horizontal, performing operations comprising:
  providing an operator of the scanning device with an indication of commencement of the capture of the temperature of the surface;
  operating the infrared detector to capture the temperature of the surface;
  providing the operator with an indication of completion of the capture of the temperature of the surface;
  retrieving a current time or date that is indicative of when the temperature of the surface was captured;
  retrieving a current location of the scanning device that is indicative of where the temperature of the surface was captured; and
  operating a transceiver of the scanning device to transmit indications of the captured temperature, the current time or date, and the current location of the scanning device to another device.

14. The method of claim 12, wherein:
a first field of view (FOV) of the infrared detector and a second FOV of the image sensor extend outwardly from the scanning device in parallel with an axis of the scanning device;
the axis comprises a forward-rearward axis extending along a lengthwise dimension of the scanning device and to the surface, and another axis extending through the scanning device and across the forward-rearward axis at a right angle; and
the method comprises:
  in response to the detection of motion being imparted to the scanning device when the scanning device is in the low power state, performing operations comprising:
    monitoring an indicia scan trigger of the scanning device to detect manual operation thereof;
    in response to detection of the manual operation of the indicia scan trigger, and to a determination that the distance between the scanning device and the surface is less than a second threshold distance, operating a light source of the scanning device to output a low level of light to illuminate the surface, and operating the image sensor to capture the image of the indicia using the low level of light;
    in response to detection of the manual operation of the indicia scan trigger, and to a determination that the distance between the scanning device and the surface is greater than the second threshold distance, operating the light source to output a high level of light that is higher than the low level of light to illuminate the surface, and operating the image sensor to capture the image of the indicia using the high level of light;
    decoding, by the processor, the indicia to retrieve the data encoded therein; and
    operating a transceiver of the scanning device to transmit the decoded data to another device.

15. A method comprising,
operating a motion sensor of a scanning device to detect motion being imparted to the scanning device when the scanning device is in a low power state;
in response to the detection of motion being imparted to the device, transitioning the device out of the low power state by performing operations comprising:
  operating a distance detector of the scanning device to determine the distance between the scanning device and a surface; and
  determining, by a processor of the scanning device, and based at least on the distance between the scanning device and the surface, whether to operate an infrared detector of the scanning device to capture a temperature of the surface, and whether to operate an image sensor of the scanning device to capture an image of an indicia that encodes data on the surface; and in response to the detection of motion being imparted to the scanning device when the scanning device is in the low power state, and in response to a determination that the distance between the scanning device and the surface is less than a first threshold distance:
  operating a light source of the scanning device to illuminate the surface;
  operating the image sensor to determine whether a set of transitions between light and dark indicative of the indicia is present on the surface; and
  in response to a determination that the set of transitions is not present on the surface:
    providing an operator of the scanning device with an indication of commencement of the capture of the temperature of the surface;
    operating the infrared detector to capture the temperature of the surface;
    providing the operator with an indication of completion of the capture of the temperature of the surface;
    retrieving a current time or date that is indicative of when the temperature of the surface was captured;
    retrieving a current location of the scanning device that is indicative of where the temperature of the surface was captured; and
    operating a transceiver of the scanning device to transmit indications of the captured temperature, the current time or date, and the current location of the scanning device to another device.

16. A method comprising:
operating a motion sensor of a scanning device to detect motion being imparted to the scanning device when the scanning device is in a low power state;
in response to the detection of motion being imparted to the device, transitioning the device out of the low power state by performing operations comprising:
  operating a distance detector of the scanning device to determine the distance between the scanning device and a surface; and
  determining, by a processor of the scanning device, and based at least on the distance between the scanning device and the surface, whether to operate an infrared detector of the scanning device to capture a temperature of the surface, and whether to operate an image sensor of the scanning device to capture an image of an indicia that encodes data on the surface;
  retrieving the current time or date from a chronometer of the scanning device, wherein the current time or date is indicative of when the temperature of the surface or the image of the indicia was captured; and
  operating a transceiver of the scanning device to transmit, to the other device, the current time or date, a current location of the scanning device, and at least one of the captured temperature and the data encoded within the indicia to enable a log of captured temperatures or encoded data to be generated by the other device.

17. The method of claim 16, comprising operating the transceiver to receive signals indicative of the current location of the scanning device from one of a plurality of satellites and a plurality of stationary wireless access devices, wherein the current location of the scanning device is indicative of where the temperature of the surface or the image of the indicia was captured.

18. The method of claim 16, wherein:
the data encoded within the indicia comprises an indication of at least one of:
  an aspect of an identity of a person, wherein the captured temperature is a temperature of a body part of the person; and
the method comprises decoding, by the processor, the indicia from within the captured image to determine the current location of the scanning device or an aspect of an identity of a person.

19. The method of claim 16, wherein:
the scanning device comprises a display and an input device; and
the method comprises:
  operating the display to provide an operator of the scanning device with an indication of the captured temperature and a request to provide at least one of:
    an indication of the current location of the scanning device; and
    an indication of an aspect of an identity of a person, wherein the captured temperature comprises a temperature of a body part of the person; and
  monitoring the input device to receive the requested indication of the current location of the scanning device or an aspect of an identity of a person.

20. The method of claim 16, comprising operating the transceiver to delay the transmission of the current time or date, and the one of the captured temperature and the data encoded within the indicia until an indication of the current location of the scanning device is received through the transceiver or an input device that enables manual input from an operator of the scanning device.

* * * * *